United States Patent
Zong et al.

(10) Patent No.: US 12,260,835 B2
(45) Date of Patent: Mar. 25, 2025

(54) DRIVING METHOD AND DRIVE CIRCUIT OF DISPLAY PANEL, DISPLAY PANEL, AND DISPLAY DEVICE

(71) Applicant: BOE Technology Group Co., Ltd., Beijing (CN)

(72) Inventors: Shaolei Zong, Beijing (CN); Xin Duan, Beijing (CN); Jigang Sun, Beijing (CN); Wei Sun, Beijing (CN); Rui Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/036,205

(22) PCT Filed: Dec. 22, 2020

(86) PCT No.: PCT/CN2020/138413
§ 371 (c)(1),
(2) Date: May 10, 2023

(87) PCT Pub. No.: WO2022/133750
PCT Pub. Date: Jun. 30, 2022

(65) Prior Publication Data
US 2023/0410759 A1    Dec. 21, 2023

(51) Int. Cl.
*G09G 3/36* (2006.01)
*G06F 3/14* (2006.01)

(52) U.S. Cl.
CPC ............. *G09G 3/3607* (2013.01); *G06F 3/14* (2013.01); *G09G 2320/0666* (2013.01); *G09G 2340/0407* (2013.01)

(58) Field of Classification Search
CPC ......... G09G 3/3607; G09G 2320/0666; G09G 2340/0407; G06F 3/14
(Continued)

(56) References Cited

U.S. PATENT DOCUMENTS

2004/0179014 A1   9/2004  Nakano et al.
2011/0299003 A1   12/2011 Arasawa et al.
(Continued)

FOREIGN PATENT DOCUMENTS

CN           1525217 A      9/2004
CN         103366700 A     10/2013
(Continued)

OTHER PUBLICATIONS

International Search Report and Written Opinion in PCT/CN2020/138413, mailed Sep. 27, 2021, 7 pages.

*Primary Examiner* — Jennifer T Nguyen
(74) *Attorney, Agent, or Firm* — ArentFox Schiff LLP; Michael Fainberg

(57) ABSTRACT

A driving method and drive circuit of a display panel, a display panel, and a display device. The method includes: receiving initial image data of a frame to be displayed, the resolution of an initial image corresponding to the initial image data being different from the resolution of a display panel; the initial image data including a plurality of pieces of initial gray scale data for displaying the initial image; according to the initial gray scale data in the initial image data, the resolution of the initial image, and the resolution of the display panel, determining target gray scale data corresponding to panel sub-pixels in the display panel; and driving the display panel to display according to the target gray scale data.

10 Claims, 10 Drawing Sheets

(58) Field of Classification Search
USPC .......................................................... 345/89
See application file for complete search history.

(56) References Cited

U.S. PATENT DOCUMENTS

| | | | |
|---|---|---|---|
| 2013/0265340 A1 | 10/2013 | Ahn | |
| 2014/0246989 A1 | 9/2014 | Wu | |
| 2018/0047350 A1* | 2/2018 | Guo | .................. G09G 3/3225 |
| 2018/0158394 A1 | 6/2018 | Guo et al. | |
| 2018/0174535 A1* | 6/2018 | Chen | .................. G09G 3/3611 |
| 2018/0210301 A1 | 7/2018 | Wu et al. | |
| 2020/0117050 A1 | 4/2020 | Shao et al. | |
| 2020/0301505 A1 | 9/2020 | Cheng et al. | |
| 2020/0333674 A1* | 10/2020 | Zhao | .................. H01L 27/124 |
| 2021/0183341 A1 | 6/2021 | Shi et al. | |
| 2021/0201841 A1* | 7/2021 | Shan | .................. G09G 3/3406 |
| 2021/0233449 A1 | 7/2021 | Zuo et al. | |

FOREIGN PATENT DOCUMENTS

| | | |
|---|---|---|
| CN | 104157216 A | 11/2014 |
| CN | 105261321 A | 1/2016 |
| CN | 105468312 A | 4/2016 |
| CN | 105609033 A | 5/2016 |
| CN | 105654920 A | 6/2016 |
| CN | 106125435 A | 11/2016 |
| CN | 106324926 A | 1/2017 |
| CN | 106935224 A | 7/2017 |
| CN | 109036246 A | 12/2018 |
| CN | 109192146 A | 1/2019 |
| CN | 109658900 A | 4/2019 |
| CN | 109830217 A | 5/2019 |
| CN | 109979389 A | 7/2019 |
| CN | 111128068 A | 5/2020 |
| CN | 111696471 A | 9/2020 |
| JP | H07199866 A | 8/1995 |
| JP | 2007052088 A | 3/2007 |

* cited by examiner

DRIVING METHOD AND DRIVE CIRCUIT OF DISPLAY PANEL, DISPLAY PANEL, AND DISPLAY DEVICE

CROSS-REFERENCE TO RELATED APPLICATIONS

This application is a National Stage of International Application No. PCT/CN2020/138413, filed Dec. 22, 2020, which is hereby incorporated by reference in its entirety.

FIELD

The present disclosure relates to the technical field of display, in particular to a driving method and drive circuit of a display panel, the display panel, and a display apparatus.

BACKGROUND

With the continuous development of a display technology, there are various display apparatuses, such as mobile phones, tablets, and virtual reality (VR) apparatuses in people's daily lives. In practical applications, a resolution of a display panel in a display apparatus becomes higher and higher. However, in general, it may occur that a resolution of an image corresponding to image data received by the display panel is different from the resolution of the display panel itself.

SUMMARY

A driving method of a display panel provided by an embodiment of the present disclosure includes: receiving initial image data of a to-be-displayed frame, wherein a resolution of an initial image corresponding to the initial image data is different from a resolution of the display panel, and the initial image data includes a plurality of pieces of initial gray scale data for displaying the initial image; determining target gray scale data corresponding to panel sub-pixels in the display panel according to the initial gray scale data in the initial image data, the resolution of the initial image and the resolution of the display panel; and driving the display panel to display according to the target gray scale data.

In some examples, the resolution of the initial image is smaller than the resolution of the display panel.

In some examples, the panel sub-pixels in the display panel are arranged into panel sub-pixel groups in a first direction, and the plurality of panel sub-pixel groups are sequentially arranged in a second direction; the panel sub-pixels in the same panel sub-pixel group are the same in color; image sub-pixels in the initial image are arranged into image sub-pixel groups in the first direction, and the plurality of image sub-pixel groups are sequentially arranged in the second direction; the image sub-pixels in the same image sub-pixel group are the same in color; an image sub-pixel corresponds to a piece of initial gray scale data; and the determining the target gray scale data corresponding to the panel sub-pixels in the display panel according to the initial gray scale data in the initial image data, the resolution of the initial image and the resolution of the display panel, specifically includes: determining, according to the resolution of the initial image and the resolution of the display panel, that the total quantity of the image sub-pixel groups in the initial image is the same as the total quantity of the panel sub-pixel groups in the display panel, wherein the total quantity of the panel sub-pixels in a panel sub-pixel group is M times the total quantity of the image sub-pixels in an image sub-pixel group, M≥2, and M is an integer; dividing M adjacent panel sub-pixels in each panel sub-pixel group into an adjustment area, such that an adjustment area corresponds to an image sub-pixel; and determining the target gray scale data corresponding to each panel sub-pixel in each adjustment area according to the initial gray scale data of the image sub-pixel corresponding to each adjustment area.

In some examples, the determining the target gray scale data corresponding to each panel sub-pixel in each adjustment area according to the initial gray scale data of the image sub-pixel corresponding to each adjustment area, specifically includes: determining each piece of initial gray scale data as the target gray scale data corresponding to a panel sub-pixel in the corresponding adjustment area; and determining, as for other panel sub-pixels except for the panel sub-pixel corresponding to the initial gray scale data in each adjustment area, the target gray scale data corresponding to the other panel sub-pixels in each adjustment area according to the initial gray scale data corresponding to each adjustment area, wherein the target gray scale data corresponding to each panel sub-pixel in the other panel sub-pixels is different.

In some examples, the equal quantity of panel sub-pixels are spaced among the panel sub-pixels corresponding to the initial gray scale data; and the panel sub-pixels corresponding to the initial gray scale data are close to an edge of the adjustment area where the panel sub-pixel is located.

In some examples, the determining the target gray scale data corresponding to the other panel sub-pixels in each adjustment area according to the initial gray scale data corresponding to each adjustment area, specifically includes: defining every two adjacent adjustment areas in the first direction as a first adjustment area and a second adjustment area; determining a data difference value corresponding to the first adjustment area according to the quantity of the other panel sub-pixels in the first adjustment area, initial gray scale data corresponding to the first adjustment area and initial gray scale data corresponding to the second adjustment area; and determining the target gray scale data corresponding to the other panel sub-pixels in the first adjustment area according to the initial gray scale data corresponding to the first adjustment area and the data difference value.

In some examples, the following formula is adopted to determine the data difference value corresponding to the first adjustment area, $$\Delta da = \frac{da_{01} - da_{02}}{M+1};$$

wherein, $\Delta da$ represents the data difference value, $da_{01}$ represents the initial gray scale data corresponding to the first adjustment area, $da_{02}$ represents the initial gray scale data corresponding to the second adjustment area, and M represents the quantity of the other panel sub-pixels in the first adjustment area; and
the following formula is adopted to determine the target gray scale data corresponding to the other panel sub-pixels in the first adjustment area, $$da_m = da_{01} - m*\Delta da;$$

wherein, m represents an $m^{th}$ panel sub-pixel of the other panel sub-pixels in the first adjustment area, and $da_m$ represents target gray scale data corresponding to the $m^{th}$ panel sub-pixel.

In some examples, the determining the target gray scale data corresponding to the other panel sub-pixels in each adjustment area according to the initial gray scale data corresponding to each adjustment area, specifically includes: determining, as for each adjustment area, the target gray scale data corresponding to the other panel sub-pixels in the adjustment area according to the following formula;

$$da_n = da_{00} * \beta_n + \gamma_n;$$

wherein, n represents an $n^{th}$ panel sub-pixel of the other panel sub-pixels in the adjustment area, $da_n$ represents target gray scale data corresponding to the $n^{th}$ panel sub-pixel, $da_{00}$ represents the initial gray scale data corresponding to the adjustment area, and $\beta_n$ and $\gamma_n$ represent parameters corresponding to the pre-determined $n^{th}$ panel sub-pixel respectively.

In some examples, the determining the target gray scale data corresponding to each panel sub-pixel in each adjustment area according to the initial gray scale data of the image sub-pixel corresponding to each adjustment area, specifically includes: determining each piece of initial gray scale data as the target gray scale data corresponding to each panel sub-pixel in the corresponding adjustment area, such that the target gray scale data corresponding to each panel sub-pixel in the adjustment area is the same.

In some examples, each panel sub-pixel includes a storage electrode; the display panel further includes: a plurality of switch control circuits, a plurality of scanning lines, a plurality of data lines and a plurality of switch control lines; a panel sub-pixel group corresponds to at least one scanning line among the plurality of scanning lines, and the panel sub-pixels arranged in the second direction correspond to at least one data line among the plurality of data lines; in each panel sub-pixel group, every two adjacent panel sub-pixels are coupled through a switch control circuit; the switch control circuit is further coupled with the corresponding scanning line and at least one switch control line among the plurality of switch control lines; when the target gray scale data corresponding to each panel sub-pixel in the other panel sub-pixels is different, the driving the display panel to display according to the target gray scale data, specifically includes: loading a gate cutting-off signal on each scanning line and loading a gate turning-on signal on each switch control line, to control each switch control circuit to disconnect the storage electrodes in two coupled panel sub-pixels; loading gate turning-on signals on the scanning lines one by one, loading a gate cutting-off signal on each switch control line, and loading the target gray scale data on each data line, such that the corresponding target gray scale data is input into the storage electrode of each panel sub-pixel; and when the target gray scale data corresponding to each panel sub-pixel in the adjustment area is the same, the driving the display panel to display according to the target gray scale data, specifically includes: loading a gate cutting-off signal on each scanning line and loading a gate turning-on signal on each switch control line, to control each switch control circuit to disconnect the storage electrodes in two coupled panel sub-pixels; loading gate turning-on signals on the scanning lines one by one, and loading the target gray scale data on the data line corresponding to a panel sub-pixel in each adjustment area, such that the corresponding target gray scale data is input into the storage electrode of each panel sub-pixel, wherein when the gate turning-on signal is loaded on the scanning line corresponding to a panel sub-pixel group, the gate cutting-off signal is loaded on the switch control line corresponding to the switch control circuit between every two adjacent panel sub-pixels which are in the panel sub-pixel group and located in different adjustment areas, and the switch control circuit is controlled to disconnect the storage electrodes in the two coupled panel sub-pixels; and the gate turning-on signal is loaded on the switch control line corresponding to the switch control circuit between every two adjacent panel sub-pixels which are in the panel sub-pixel group and located in the same adjustment area, and the switch control circuit is controlled to conduct the storage electrodes in the two coupled panel sub-pixels.

A drive circuit of a display panel provided by an embodiment of the present disclosure includes: a receiving circuit, configured to receive initial image data of a to-be-displayed frame, wherein a resolution of an initial image corresponding to the initial image data is different from a resolution of the display panel, and the initial image data includes a plurality of pieces of initial gray scale data for displaying the initial image; a target determining circuit, configured to determine target gray scale data corresponding to panel sub-pixels in the display panel according to the initial gray scale data in the initial image data, the resolution of the initial image and the resolution of the display panel; and a display drive circuit, configured to drive the display panel to display according to the target gray scale data.

A display panel provided by an embodiment of the present disclosure includes: a plurality of panel sub-pixels, a plurality of scanning lines, a plurality of data lines, a plurality of switch control circuits and a plurality of switch control lines; a row of panel sub-pixels corresponds to at least one scanning line among the plurality of scanning lines, and a column of panel sub-pixels corresponds to at least one data line among the plurality of data lines; each panel sub-pixel includes a storage electrode; in each panel sub-pixel group, every two adjacent panel sub-pixels are coupled through a switch control circuit; the switch control circuit is further coupled with the scanning line corresponding to the panel sub-pixel and at least one switch control line among the plurality of switch control lines; and the switch control circuit is configured to conduct and disconnect the storage electrodes in the coupled panel sub-pixels in response to signals on the coupled scanning lines and signals on the switch control lines.

In some examples, every two adjacent panel sub-pixels in the first direction are defined as a first panel sub-pixel and a second panel sub-pixel; the second panel sub-pixel further includes: a data writing circuit and a conducting control circuit, wherein a control end of the data writing circuit is coupled with the scanning line, a first end of the data writing circuit is coupled with the data line, and a second end of the data writing circuit is coupled with a first end of the conducting control circuit; the data writing circuit is configured to conduct the coupled data line and the conducting control circuit in response to signals on the coupled scanning line; a control end of the conducting control circuit is coupled with a storage electrode in the first panel sub-pixel through the switch control circuit, and a second end of the switch control circuit is coupled with the storage electrode in the second panel sub-pixel; and the switch control circuit is configured to conduct the coupled data writing circuit and the storage electrode in response to signals on the coupled switch control line.

In some examples, the switch control circuit includes: a first switch transistor, a second switch transistor and a switch capacitor; a gate of the first switch transistor is coupled with the switch control line, a first pole of the first switch transistor is coupled with the scanning line, and a second pole of the first switch transistor is coupled with a first electrode of the switch capacitor, a gate of the second switch transistor and a control end of the conducting control circuit in the first panel sub-pixel respectively; a first pole of the second switch transistor is coupled with the storage electrode in the first panel sub-pixel, and a second pole of the second switch transistor is coupled with the storage electrode in the second panel sub-pixel; and a second electrode of the switch capacitor is coupled with a reference signal end.

In some examples, the data writing circuit includes: a data writing transistor; a gate of the data writing transistor is taken as the control end of the data writing circuit, a first pole of the data writing transistor is taken as the first end of the data writing circuit, and a second pole of the data writing transistor is taken as the second end of the data writing circuit; the conducting control circuit includes: a conducting control transistor; and the gate of the conducting control transistor is taken as the control end of the conducting control circuit, a first pole of the conducting control transistor is taken as the first end of the conducting control circuit, and a second pole of the conducting control transistor is taken as the second end of the conducting control circuit.

A display apparatus provided by an embodiment of the present disclosure includes the above drive circuit of the display panel, and/or the above display panel.

DETAILED DESCRIPTION OF THE EMBODIMENTS

Figure 1:
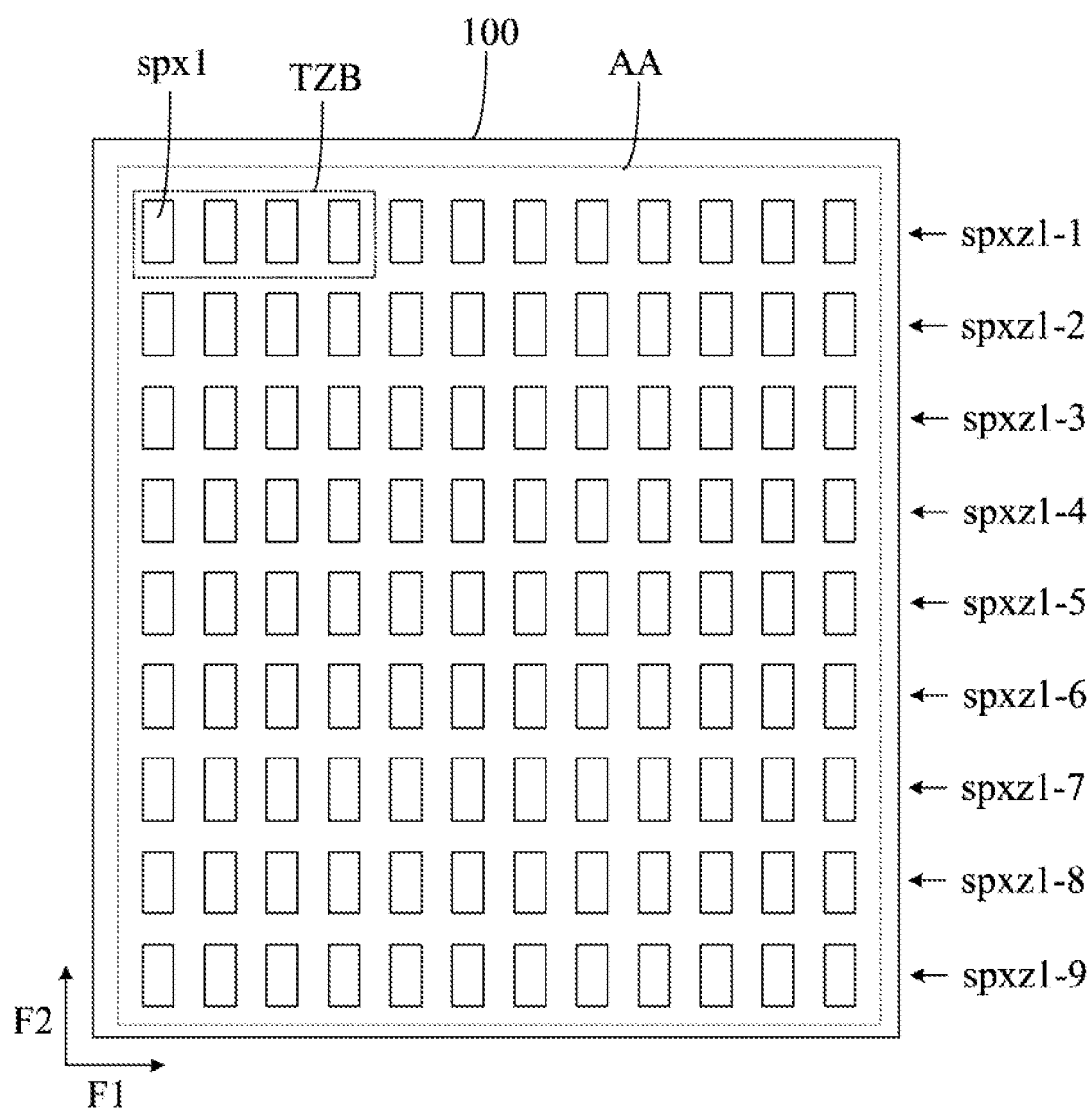
FIG. 1 is some schematic structural diagrams of a display panel in an embodiment of the present disclosure.

To make objectives, technical solutions and advantages of embodiments of the present disclosure clearer, the technical solutions of the embodiments of the present disclosure will be clearly and completely described below in conjunction with accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those ordinarily skilled in the art without creative work shall fall within the protection scope of the present disclosure.

Unless otherwise defined, technical of scientific terms used in the present disclosure shall have the ordinary meanings understood by those ordinarily skilled in the art to which the present disclosure pertains. The words "first", "second" and similar words used in the present disclosure do not indicate any order, quantity or importance, but are merely used to distinguish different components. The words "comprise" or "include", and the like indicate that an element or item appearing before such word covers listed elements or items appearing after the word and equivalents thereof, and does not exclude other elements or items. The words "connect" or "couple" or the like are not limited to physical or mechanical connection, but may include electrical connection, whether direct or indirect.

It needs to be noted that sizes and shapes of all figures in the accompanying drawings do not reflect true scales, and are only intended to schematically illustrate the content of the present disclosure. The same or similar reference numerals represent the same or similar elements or elements with the same or similar functions all the time.

As shown in FIG. 1, a display panel may include a base substrate 100 having a display area AA. The display area AA may include a plurality of panel pixel units distributed in an array. Each panel pixel unit may include a plurality of panel sub-pixels spx1. Exemplarily, each panel pixel unit may include a red panel sub-pixel, a green panel sub-pixel and a blue panel sub-pixel, and in this way, color mixing may be performed through red, green and blue, so as to realize color display. Alternatively, each panel pixel unit may also include a red panel sub-pixel, a green panel sub-pixel, a blue panel sub-pixel and a white panel sub-pixel, and in this way, color mixing may be performed through red, green, blue and white, so as to realize color display. Of course, in practical applications, the light-emitting color of the panel sub-pixels in the panel pixel units may be designed and determined according to actual application environment, which is not limited here.

Exemplarily, as shown in FIG. 1, the panel sub-pixels in the display panel may be arranged into panel sub-pixel groups in a first direction, and the plurality of panel sub-pixel groups are sequentially arranged in a second direction. In this way, the panel sub-pixels may be distributed in a display area in an array. In some examples, the panel sub-pixels in the same panel sub-pixel group are the same in color. The panel sub-pixels in adjacent panel sub-pixel groups may be different in color. For example, with reference to FIG. 1, the color of the panel sub-pixels in a first panel sub-pixel group spxz1-1 may be red, the color of the panel sub-pixels in a second panel sub-pixel group spxz1-2 may be green, the color of the panel sub-pixels in a third panel sub-pixel group spxz1-3 may be blue, the color of the panel sub-pixels in a fourth panel sub-pixel group spxz1-4 may be red, the color of the panel sub-pixels in a fifth panel sub-pixel group spxz1-5 is green, the color of the panel sub-pixels in a sixth panel sub-pixel group spxz1-6 may be blue, the color of the panel sub-pixels in a seventh panel sub-pixel group spxz1-7 may be red, the color of the panel sub-pixels in an eighth panel sub-pixel group spxz1-8 may be green, and the color of the panel sub-pixels in a ninth panel sub-pixel group spxz1-9 may be blue. In this way, three panel sub-pixels adjacent in the second direction may be taken as a panel pixel unit. For example, in the first panel sub-pixel group spxz1-1 to the third panel sub-pixel group spxz1-3, the three panel sub-pixels adjacent in the second direction form a panel pixel unit.

In practical applications, image data needs to be input into the display panel, such that the display panel displays a corresponding image. The image data input into the display panel may be an externally input signal (for example, it is input through a network, a broadcast signal or a USB storage device), and in this way, the image data input into the display panel may have a variety of input resolutions. For example, the resolutions of the image data may be 640*480, 800*600, 1024*768 and 1280*768. In this way, there may be different resolutions between the display panel and the input image data.

Figure 2:
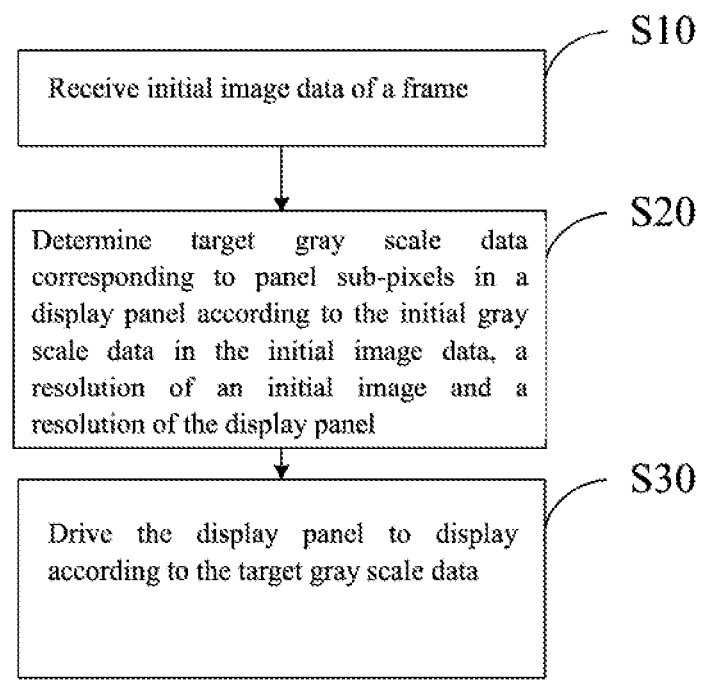
FIG. 2 is a flow chart of a driving method in an embodiment of the present disclosure.

Based on this, an embodiment of the present disclosure provides a driving method of a display panel, and as shown in FIG. 2, the driving method may include the following steps.

S10, initial image data of a to-be-displayed frame is received.

The initial image data is used for displaying an initial image. A resolution of the initial image corresponding to the initial image data is different from a resolution of the display panel. Exemplarily, the resolution of the initial image may be smaller than the resolution of the display panel. For example, the resolution of the display panel is 1280*768, and the resolution of the initial image is 1024*768. Further, the quantity of rows in the resolution of the initial image may be smaller than the quantity of rows in the resolution of the display panel, and the quantity of columns in the resolution of the initial image may be equal to the quantity of columns in the resolution of the display panel. Alternatively, the quantity of rows in the resolution of the initial image may be equal to the quantity of rows in the resolution of the display panel, and the quantity of columns in the resolution of the initial image is smaller than the quantity of columns in the resolution of the display panel. Alternatively, the quantity of rows in the resolution of the initial image may be smaller than the quantity of rows in the resolution of the display panel, and the quantity of columns in the resolution of the initial image may be smaller than the quantity of columns in the resolution of the display panel. Of course, in practical applications, it may be determined according to needs of the practical applications, which is not limited here.

Exemplarily, the resolution of the initial image may also be greater than the resolution of the display panel. For example, the resolution of the display panel is 1024*768, and the resolution of the initial image is 1280*768. Further, the quantity of rows in the resolution of the initial image may be greater than the quantity of rows in the resolution of the display panel, and the quantity of columns in the resolution of the initial image may be equal to the quantity of columns in the resolution of the display panel. Alternatively, the quantity of rows in the resolution of the initial image may be equal to the quantity of rows in the resolution of the display panel, and the quantity of columns in the resolution of the initial image is greater than the quantity of columns in the resolution of the display panel. Alternatively, the quantity of rows in the resolution of the initial image may be greater than the quantity of rows in the resolution of the display panel, and the quantity of columns in the resolution of the initial image may be greater than the quantity of columns in the resolution of the display panel. Of course, in practical applications, it may be determined according to the needs of the practical applications, which is not limited here.

Figure 3:
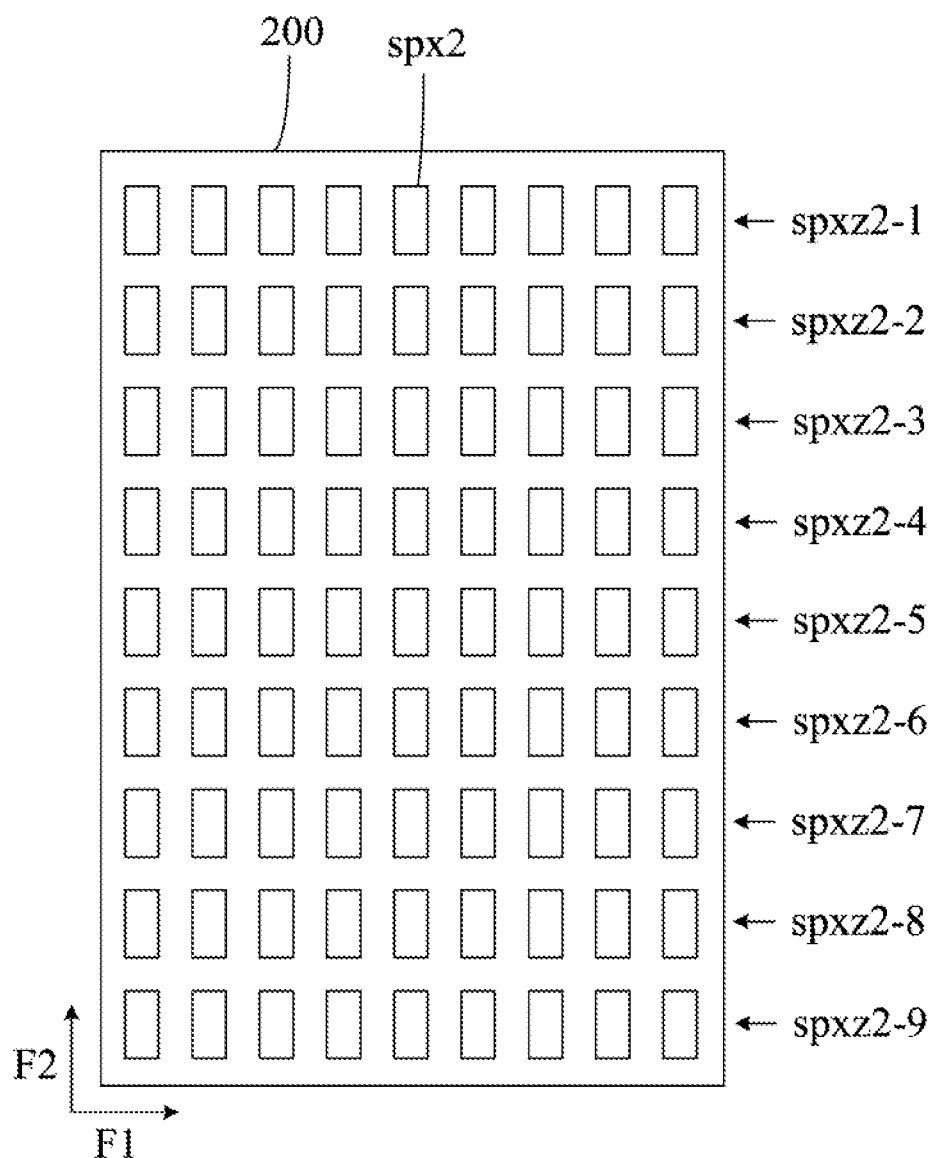
FIG. 3 is some other schematic structural diagrams of a display panel in an embodiment of the present disclosure.

As shown in FIG. 3, the initial image 200 may include a plurality of image pixel units, and each image pixel unit may include a plurality of image sub-pixels spx2. Exemplarily, the image pixel unit may include a red image sub-pixel, a green image sub-pixel and a blue image sub-pixel, and in this way, color mixing may be performed through red, green and blue, such that the initial image realizes color display. Alternatively, the image pixel unit may also include red image sub-pixels, green image sub-pixels, blue image sub-pixels and white image sub-pixels, so that color mixing may be performed through red, green, blue and white, such that the initial image realizes color display. It should be noted that an initial display panel is selected, and a resolution of the initial display panel is the same as the resolution of the initial image. When the initial image is displayed on the initial display panel, image sub-pixels of the displayed initial image are in one-to-one correspondence with the sub-pixels of the initial display panel.

Exemplarily, as shown in FIG. 3, the image sub-pixels in the initial image 200 may be arranged into image sub-pixel groups in a first direction, and the plurality of image sub-pixel groups are sequentially arranged in a second direction. In this way, the image sub-pixels may be distributed in an array. In some examples, the image sub-pixels in the same image sub-pixel group are the same in color. In this way, the image sub-pixels in adjacent image sub-pixel groups may be different in color. For example, with reference to FIG. 3, the color of the image sub-pixels in a first image sub-pixel group spxz2-1 may be red, the color of the image sub-pixels in a second image sub-pixel group spxz2-2 may be green, the color of the image sub-pixels in a third image sub-pixel group spxz2-3 may be blue, the color of the image sub-pixels in a fourth image sub-pixel group spxz2-4 may be red, the color of the image sub-pixels in a fifth image sub-pixel group spxz2-5 may be green, the color of the image sub-pixels in a sixth image sub-pixel group spxz2-5 may be blue, the color of the image sub-pixels in a seventh image sub-pixel group spxz2-7 may be red, the color of the image sub-pixels in an eighth image sub-pixel group spxz2-8 may be green, and the color of the image sub-pixels in a ninth image sub-pixel group spxz2-9 may be blue. In this way, three image sub-pixels adjacent in the second direction may be taken as an image pixel unit. For example, in the first image sub-pixel group spxz2-1 to the third image sub-pixel group spxz2-3, the three image sub-pixels adjacent in the second direction form an image pixel unit.

Gray scales are generally used for dividing brightness change between the darkest and the brightest into a plurality of parts to facilitate screen brightness control. Generally, each pixel unit of the display panel is usually composed of a red panel sub-pixel, a green panel sub-pixel and a blue panel sub-pixel, which may present many different colors, and light emitted by each panel sub-pixel may show different brightness levels. The gray scale represents different brightness levels between the darkest and the brightest. The more the levels therebetween, the finer the presented picture effect. Generally, the display panel adopts a 6-bit panel or an 8-bit panel to realize image display. The 8-bit panel can represent $2^8$ brightness levels, and the panel may have 256 gray scales, namely 0-255 gray scales. The 6-bit panel can represent $2^6$ brightness levels, and the panel may have 64 gray scales, namely 0-63 gray scales. The following is explained by using the 8-bit panel. In some examples, the initial image data may include a plurality of pieces of initial gray scale data for displaying the corresponding initial image. An image sub-pixel of the initial image corresponds to a piece of initial gray scale data. The initial gray scale data may correspond to to-be-displayed gray scales.

S20, target gray scale data corresponding to panel sub-pixels in the display panel is determined according to the initial gray scale data in the initial image data, the resolution of the initial image and the resolution of the display panel.

S30, the display panel is driven to display according to the target gray scale data.

According to the above driving method of the display panel provided by the embodiment of the present disclosure, since the resolution of the received to-be-displayed initial image is different from the resolution of the display panel, the target gray scale data corresponding to the panel sub-pixels in the display panel may be determined according to the initial gray scale data in the initial image data, the resolution of the initial image, and the resolution of the display panel, so as to convert the initial gray scale data into the target gray scale data corresponding to the panel sub-pixels in the display panel, so that the display panel can display according to the target gray scale data. In this way, when there are different resolutions between the display panel and the input initial image data, a normal display function can also be realized.

With the development of a display technology, the resolution of the display panel becomes higher and higher, and in this way, the resolution of the initial image input into the display panel is usually smaller than the resolution of the display panel. In some examples, the determining the target gray scale data corresponding to the panel sub-pixels in the display panel according to the initial gray scale data in the initial image data, the resolution of the initial image and the resolution of the display panel, specifically may include:

it is determined that the total quantity of the image sub-pixel groups in the initial image is the same as the total quantity of the panel sub-pixel groups in the display panel according to the resolution of the initial image and the resolution of the display panel, and the total quantity of the panel sub-pixels in a panel sub-pixel group is M times the total quantity of the image sub-pixels in an image sub-pixel group;

M adjacent panel sub-pixels in each panel sub-pixel group are divided into an adjustment area, such that an adjustment area corresponds to an image sub-pixel, wherein M≥2, and M is an integer; and the target gray scale data corresponding to each panel sub-pixel in each adjustment area is determined according to the initial gray scale data of the image sub-pixel corresponding to each adjustment area.

Exemplarily, since the resolution of the initial image is smaller than the resolution of the display panel, an image sub-pixel of the initial image may correspond to a plurality of panel sub-pixels of the display panel, and in this way, a piece of initial gray scale data in the initial image data may correspond to a plurality of panel sub-pixels in the display panel. In addition, the panel sub-pixels in the display panel corresponding to each piece of initial gray scale data are different. In this way, the target gray scale data of each panel sub-pixel in the display panel may be obtained through the initial gray scale data.

Exemplarily, the panel sub-pixels in the display panel may be divided into adjustment areas according to the resolution of the initial image. The total quantity of the panel sub-pixels in each adjustment area may be equal. For example, each adjustment area may include M adjacent panel sub-pixels in a panel sub-pixel group. For example, if M=2, the adjust- ment area includes 2 adjacent panel sub-pixels in a panel sub-pixel group. Alternatively, if M=3, the adjustment area includes 3 adjacent panel sub-pixels in a panel sub-pixel group. Alternatively, as shown in FIG. 1, if M=4, the adjustment area includes 4 adjacent panel sub-pixels in a panel sub-pixel group. Of course, in practical applications, a specific value of M may be determined according to the needs of the practical applications, which is not limited here.

In some examples, during specific implementation, the determining the target gray scale data corresponding to each panel sub-pixel in each adjustment area according to the initial gray scale data of the image sub-pixel corresponding to each adjustment area, specifically includes:

each piece of initial gray scale data is determined as the target gray scale data corresponding to a panel sub-pixel in the corresponding adjustment area; and as for other panel sub-pixels except for the panel sub-pixel corresponding to the initial gray scale data in each adjustment area, the target gray scale data corresponding to the other panel sub-pixels in each adjustment area is determined according to the initial gray scale data corresponding to each adjustment area, wherein the target gray scale data corresponding to each panel sub-pixel in the other panel sub-pixels is different.

Exemplarily, since a piece of initial gray scale data corresponds to an adjustment area, and an adjustment area also includes a plurality of panel sub-pixels, a piece of initial gray scale data may be used as the target gray scale data of a panel sub-pixel in the corresponding adjustment area, such that a panel sub-pixel in the adjustment area may retain the corresponding initial gray scale data; and the target gray scale data corresponding to the other panel sub-pixels in each adjustment area may further be determined according to the initial gray scale data corresponding to each adjustment area, so as to expand the gray scale data, and realize a high-resolution display effect.

Figure 4:
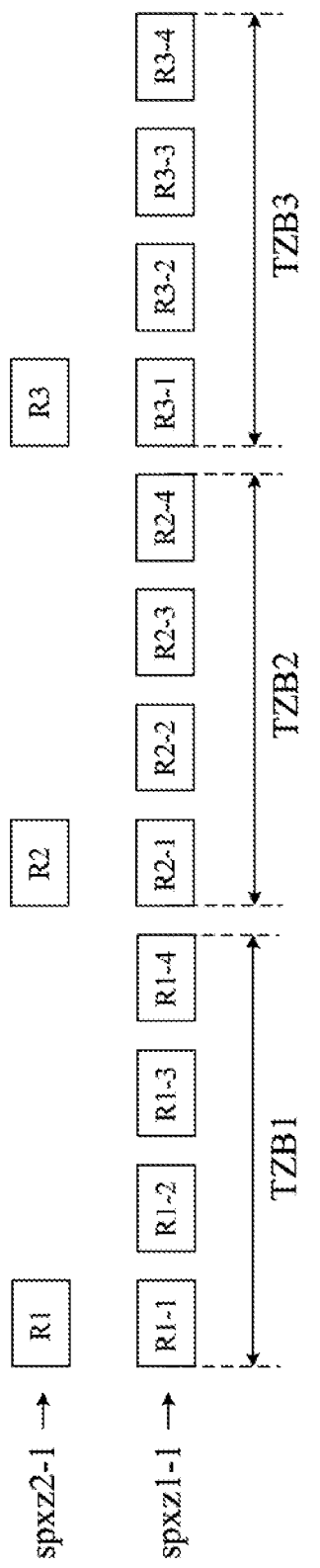
FIG. 4 is a schematic diagram of an image sub-pixel and an adjustment area in an embodiment of the present disclosure.

In some examples, the equal quantity of panel sub-pixels are spaced among the panel sub-pixels corresponding to the initial gray scale data; and the panel sub-pixels corresponding to the initial gray scale data are close to an edge of the adjustment area where the panel sub-pixels are located. For example, as shown in FIG. 4, the first panel sub-pixel group spxz1-1 is taken as an example for illustration. The first panel sub-pixel group spxz1-1 may have 3 adjustment areas TZB1, TZB2 and TZB3. The panel sub-pixel corresponding to the initial gray scale data in the adjustment area TZB1 is R1-1, the panel sub-pixel corresponding to the initial gray scale data in the adjustment area TZB2 is R2-1, and the panel sub-pixel corresponding to the initial gray scale data in the adjustment area TZB3 is R3-1. 3 panel sub-pixels are spaced between the panel sub-pixel R1-1 and the panel sub-pixel R2-1, and 3 panel sub-pixels are spaced between the panel sub-pixel R2-1 and the panel sub-pixel R3-1.

In some examples, during specific implementation, the determining the target gray scale data corresponding to the other panel sub-pixels in each adjustment area according to the initial gray scale data corresponding to each adjustment area, specifically may include:

every two adjacent adjustment areas in the first direction are defined as a first adjustment area and a second adjustment area;

a data difference value corresponding to the first adjustment area is determined according to the quantity of the other panel sub-pixels in the first adjustment area, initial gray scale data corresponding to the first adjustment area and initial gray scale data corresponding to the second adjustment area; and the target gray scale data corresponding to the other panel sub-pixels in the first adjustment area is determined according to the initial gray scale data corresponding to the first adjustment area and the data difference value.

Exemplarily, as shown in FIG. 4, the target gray scale data of the panel sub-pixel R1-1 in the adjustment area TZB1 corresponds to the initial gray scale data of an image sub-pixel R1, and the panel sub-pixels R1-2 to R1-4 are other panel sub-pixels except for the panel sub-pixel R1-1. The target gray scale data of the panel sub-pixel R2-1 in the adjustment area TZB2 corresponds to the initial gray scale data of an image sub-pixel R2, and the panel sub-pixels R2-2 to R2-4 are other panel sub-pixels except for the panel sub-pixel R2-1. The target gray scale data of the panel sub-pixel R3-1 in the adjustment area TZB3 corresponds to the initial gray scale data of an image sub-pixel R3, and the panel sub-pixels R3-2 to R3-4 are other panel sub-pixels except for the panel sub-pixel R3-1.

Exemplarily, as shown in FIG. 4, in the adjacent adjustment areas TZB1 and TZB2, the adjustment area TZB1 may be defined as the first adjustment area, and the adjustment area TZB2 may be defined as the second adjustment area. In this way, the data difference value corresponding to the adjustment area TZB1 may be determined according to the quantity of the panel sub-pixels R1-2 to R1-4 in the adjustment area TZB1, the initial gray scale data corresponding to the adjustment area TZB1 and the initial gray scale data corresponding to the adjustment area TZB2. Then, the target gray scale data corresponding to the panel sub-pixels R1-2 to R1-4 respectively in the adjustment area TZB1 may be determined according to the initial gray scale data corresponding to the adjustment area TZB1 and the data difference value.

Exemplarily, as shown in FIG. 4, in the adjacent adjustment areas TZB2 and TZB3, the adjustment area TZB2 may be defined as the first adjustment area, and the adjustment area TZB3 may be defined as the second adjustment area. In this way, the data difference value corresponding to the adjustment area TZB2 may be determined according to the quantity of the panel sub-pixels R2-2 to R2-4 in the adjustment area TZB2, the initial gray scale data corresponding to the adjustment area TZB2 and the initial gray scale data corresponding to the adjustment area TZB3. Then, the target gray scale data corresponding to the panel sub-pixels R2-2 to R2-4 respectively in the adjustment area TZB2 may be determined according to the initial gray scale data corresponding to the adjustment area TZB2 and the data difference value.

In some examples, during specific implementation, the following formula is adopted to determine the data difference value corresponding to the first adjustment area;

$$\Delta da = \frac{da_{01} - da_{02}}{M+1};$$

wherein, $\Delta da$ represents the data difference value, $da_{01}$ represents the initial gray scale data corresponding to the first adjustment area, $da_{02}$ represents the initial gray scale data corresponding to the second adjustment area, and M represents the quantity of the other panel sub-pixels in the first adjustment area.

In some examples, during specific implementation, the following formula is adopted to determine the target gray scale data corresponding to other panel sub-pixels in first adjustment area, $$da_m = da_{01} - m*\Delta da;$$

wherein, m represents an $m^{th}$ panel sub-pixel of the other panel sub-pixels in the first adjustment area, and $da_m$ represents the target gray scale data corresponding to the $m^{th}$ panel sub-pixel.

Exemplarily, as shown in FIG. 4, when in the adjacent adjustment areas TZB1 and TZB2, the adjustment area TZB1 is defined as the first adjustment area, and the adjustment area TZB2 is defined as the second adjustment area, the data difference value $\Delta da$ corresponding to the adjustment area TZB1 may be obtained. The panel sub-pixel R1-2 is used as a first panel sub-pixel in the adjustment area TZB1, and the corresponding target gray scale data $da1=da01-\Delta da$. The panel sub-pixel R1-3 is used as a second panel sub-pixel in the adjustment area TZB1, and the corresponding target gray scale data $da2=da01-2\Delta da$. The panel sub-pixel R1-4 is used as a third panel sub-pixel in the adjustment area TZB1, and the corresponding target gray scale data $da3=da01-3\Delta da$.

Exemplarily, as shown in FIG. 4, when in the adjacent adjustment areas TZB2 and TZB3, the adjustment area TZB2 is defined as the first adjustment area, and the adjustment area TZB3 is defined as the second adjustment area, the data difference value $\Delta da$ corresponding to the adjustment area TZB2 may be obtained. The panel sub-pixel R2-2 is used as a first panel sub-pixel in the adjustment area TZB2, and the corresponding target gray scale data $da1=da01-\Delta da$. The panel sub-pixel R2-3 is used as a second panel sub-pixel in the adjustment area TZB2, and the corresponding target gray scale data $da2=da01-2\Delta da$. The panel sub-pixel R2-4 is used as a third panel sub-pixel in the adjustment area TZB2, and the corresponding target gray scale data $da3=da01-3\Delta da$. It should be noted that although the data difference value corresponding to the adjustment area TZB1 and the data difference value corresponding to the adjustment area TZB2 both are represented by $\Delta da$, it does not represent that the data difference value corresponding to the adjustment area TZB1 and the data difference value corresponding to the adjustment area TZB2 are the same. The $\Delta da$ is only a marker representing the data difference value corresponding to the adjustment area TZB1 and the data difference value corresponding to the adjustment area TZB2. Specifically, the data difference value corresponding to the adjustment area TZB1 and the data difference value corresponding to the adjustment area TZB2 may be determined according to actual conditions, which is not limited here.

The driving method of the display panel provided by the present disclosure is illustrated below through specific embodiments. The driving method of the display panel provided by the embodiment of the present disclosure may include the following steps:

(1) initial image data of a to-be-displayed frame is received. A resolution of an initial image corresponding to the initial image data is smaller than a resolution of the display panel;

(2) taking M=4 as an example, it is determined that the total quantity of image sub-pixel groups in the initial image is the same as the total quantity of panel sub-pixel groups in the display panel according to the resolution of the initial image and the resolution of the display panel, and the total quantity of panel sub-pixels in a panel sub-pixel group is 4 times the total quantity of image sub-pixels in an image sub-pixel group.

Exemplarily, the resolution of the display panel is A1*B1, A1 represents the total quantity of the panel sub-pixels in a panel sub-pixel group, and B1 represents the total quantity of the panel sub-pixel groups. The resolution of the initial image may be A2*B2, A2 represents the total quantity of the image sub-pixels in an image sub-pixel group, and B2 represents the total quantity of the image sub-pixel groups. The total quantity of the image sub-pixel groups in the initial image is the same as the total quantity of the panel sub-pixel groups in the display panel, which may mean that B1 is the same as B2. For example, as shown in FIG. 1 and FIG. 4, the initial image has image sub-pixel groups spxz2-1 to spxz2-9, with a total of 9 image sub-pixel groups. The display panel has panel sub-pixel groups spxz1-1 to spxz1-9, with a total of 9 panel sub-pixel groups. It may be explained that B1 is the same as B2.

Exemplarily, the total quantity of the panel sub-pixels in a panel sub-pixel group is M times the total quantity of the image sub-pixels in an image sub-pixel group, which may mean that A1/A2=M. For example, as shown in FIG. 4, the first panel sub-pixel group spxz1-1 and the first image sub-pixel group spxz2-1 are taken as examples for illustration. The first panel sub-pixel group spxz1-1 has 12 panel sub-pixels, the first image sub-pixel group spxz2-1 has 3 image sub-pixels, and the total quantity of the panel sub-pixels in the first panel sub-pixel group spxz1-1 is 4 times the total quantity of the panel sub-pixels in the first panel sub-pixel group spxz1-1.

(3) 4 adjacent panel sub-pixels in each panel sub-pixel group are divided into an adjustment area, such that an adjustment area corresponds to an image sub-pixel.

For example, as shown in FIG. 4, the first panel sub-pixel group spxz1-1 is taken as an example for illustration. The first panel sub-pixel group spxz1-1 may have 3 adjustment areas TZB1, TZB2 and TZB3. The 3 adjustment areas TZB1, TZB2 and TZB3 may include 4 panel sub-pixels. In addition, the adjustment area TZB1 corresponds to an image sub-pixel R1 in the first image sub-pixel group spxz2-1, the adjustment area TZB2 corresponds to an image sub-pixel R2 in the first image sub-pixel group spx22-1, and the adjustment area TZB3 corresponds to an image sub-pixel R3 in the first image sub-pixel group spxz2-1.

(4) each piece of initial gray scale data is determined as the target gray scale data corresponding to a panel sub-pixel in the corresponding adjustment area.

For example, as shown in FIG. 4, the target gray scale data of a panel sub-pixel R1-1 in the adjustment area TZB1 is the initial gray scale data of the image sub-pixel R1. The target gray scale data of the panel sub-pixel R2-1 in the adjustment area TZB2 is the initial gray scale data of the image sub-pixel R2. The target gray scale data of the panel sub-pixel R3-1 in the adjustment area TZB3 is the initial gray scale data of the image sub-pixel R3.

(5) every two adjacent adjustment areas in the first direction are defined as a first adjustment area and a second adjustment area.

For example, as shown in FIG. 4, in the adjacent adjustment areas TZB1 and TZB2, the adjustment area TZB1 may be defined as the first adjustment area, and the adjustment area TZB2 may be defined as the second adjustment area. In the adjacent adjustment areas TZB2 and TZB3, the adjustment area TZB2 is defined as the first adjustment area, and the adjustment area TZB3 is defined as the second adjustment area.

(6) when in the adjacent adjustment areas TZB1 and TZB2, the adjustment area TZB1 is defined as the first adjustment area, and the adjustment area TZB2 is defined as the second adjustment area, according to a formula $$\Delta da = \frac{da_{01} - da_{02}}{M+1},$$

a data difference value $\Delta da$ (represented by $\Delta da'$) corresponding to the adjustment area TZB1 may be determined.

When in the adjacent adjustment areas TZB2 and TZB3, the adjustment area TZB2 is defined as the first adjustment area, and the adjustment area TZB3 is defined as the second adjustment area, according to a formula $$\Delta da = \frac{da_{01} - da_{02}}{M+1},$$

a data difference value $\Delta da$ (represented by $\Delta da''$) corresponding to the adjustment area TZB2 may be determined.

(7) when in the adjacent adjustment areas TZB1 and TZB2, the adjustment area TZB1 is defined as the first adjustment area, and the adjustment area TZB2 is defined as the second adjustment area, the panel sub-pixel R1-2 is used as a first panel sub-pixel in the adjustment area TZB1, and the target gray scale data da1 corresponding to the panel sub-pixel R1-2=da01−Δda'. The panel sub-pixel R1-3 is used as a second panel sub-pixel in the adjustment area TZB1, and the target gray scale data da2 corresponding to the panel sub-pixel R1-3=da01−2Δda'. The panel sub-pixel R1-4 is used as a third panel sub-pixel in the adjustment area TZB1, and the target gray scale data da3 corresponding to the panel sub-pixel R1-4=da01−3Δda'. For example, da01=255, da02=251, Δda'=1, then, da1=254, da2=253, and da3=252.

When in the adjacent adjustment areas TZB2 and TZB3, the adjustment area TZB2 is defined as the first adjustment area, and the adjustment area TZB3 is defined as the second adjustment area, the panel sub-pixel R2-2 is used as a first panel sub-pixel in the adjustment area TZB2, and the target gray scale data da1 corresponding to the panel sub-pixel R2-2=da01−Δda''. The panel sub-pixel R2-3 is used as a second panel sub-pixel in the adjustment area TZB2, and the target gray scale data da2 corresponding to the panel sub-pixel R2-3=da01−2Δda''. The panel sub-pixel R2-4 is used as a third panel sub-pixel in the adjustment area TZB2, and the target gray scale data da3 corresponding to the panel sub-pixel R2-4=da01−3Δda''. For example, da01=251, da02=255, Δda''=1, then, da1=252, da2=253, and da3=254.

In the same adjustment area, as for other panel sub-pixels except for the panel sub-pixel corresponding to the initial gray scale data, the target gray scale data corresponding to each panel sub-pixel in the other panel sub-pixels is different.

(8) the display panel is driven to display according to the target gray scale data. When the target gray scale data corresponding to each panel sub-pixel in the other panel sub-pixels is different, the driving the display panel to display according to the target gray scale data, specifically may include:

a gate cutting-off signal is loaded on each scanning line GA, and a gate turning-on signal is loaded on each switch control line SW to control each switch control circuit 200 to disconnect storage electrodes 113 in two coupled panel sub-pixels; and gate turning-on signals are loaded on the scanning lines GA one by one, a gate cutting-off signal is loaded on each switch control line SW, and the target gray scale data is loaded on each data line DA, such that the corresponding target gray scale data is input into the storage electrodes 113 of each panel sub-pixel.

Figure 5:
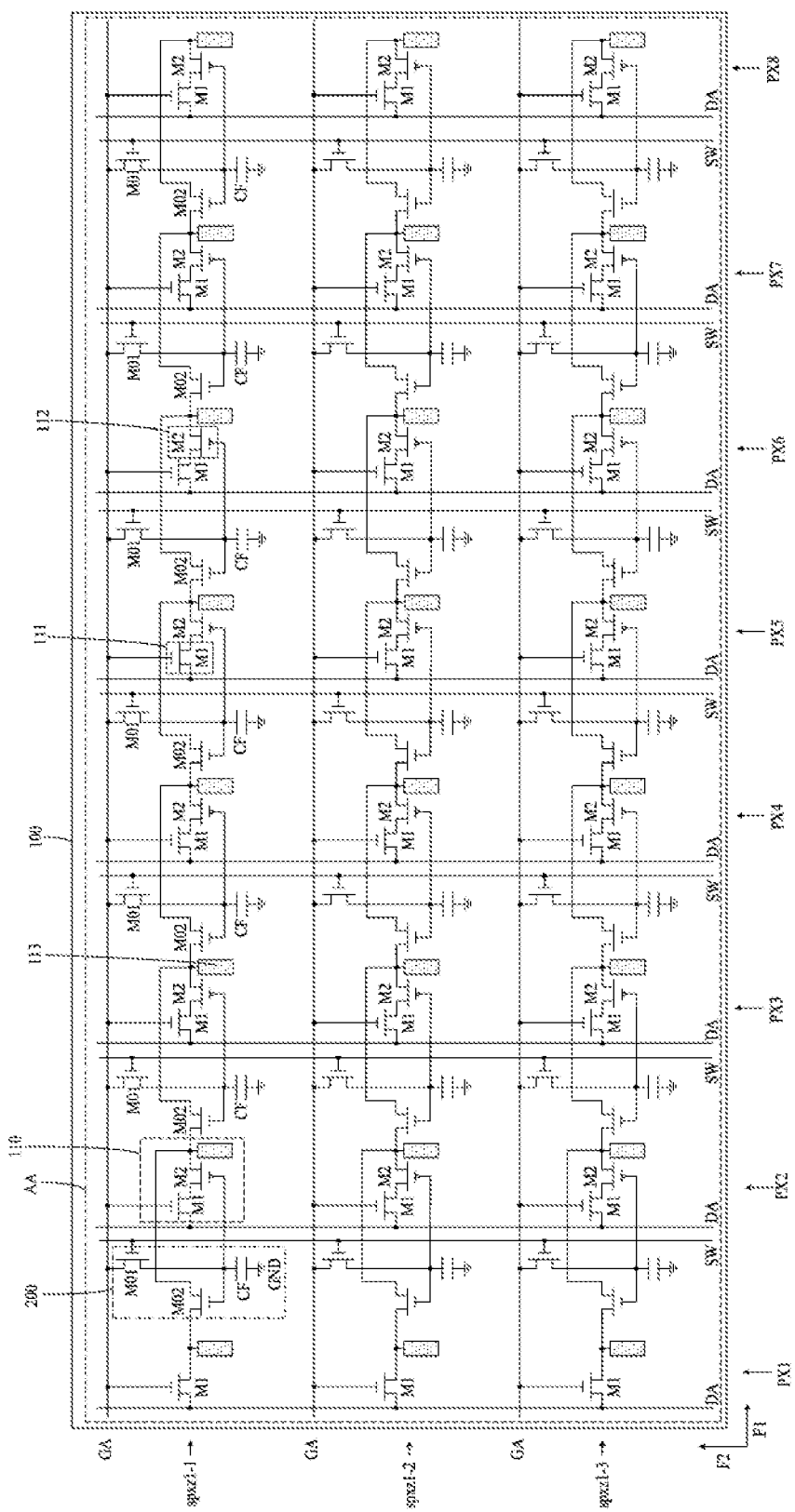
FIG. 5 is some specific schematic structural diagrams of a display panel in an embodiment of the present disclosure.

Exemplarily, as shown in FIG. 5, each panel sub-pixel includes a storage electrode 113. In addition, the display panel may further include: a plurality of switch control circuits 200, a plurality of scanning lines GA, a plurality of data lines DA and a plurality of switch control lines SW; and a panel sub-pixel group corresponds to at least one scanning line GA among the plurality of scanning lines GA, and the panel sub-pixels arranged in the second direction correspond to at least one data line DA among the plurality of data lines DA. In each panel sub-pixel group, every two adjacent panel sub-pixels are coupled through a switch control circuit 200; the switch control circuit 200 is further coupled with the scanning lines GA corresponding to the panel sub-pixels and at least one switch control line SW among the plurality of switch control lines SW; and the switch control circuit 200 is configured to conduct and disconnect the storage electrodes 113 in the coupled panel sub-pixels in response to signals on the coupled scanning lines GA and signals on the switch control lines SW.

In some examples, during specific implementation, as shown in FIG. 5, every two adjacent panel sub-pixels in the first direction are defined as a first panel sub-pixel and a second panel sub-pixel. For example, taking a first panel sub-pixel group spxz1-1 as an example, in the adjacent first panel sub-pixel PX1 and second panel sub-pixel PX2, the first panel sub-pixel PX1 is defined as a first panel sub-pixel, and the second panel sub-pixel PX2 is defined as a second panel sub-pixel. In the adjacent second panel sub-pixel PX2 and third panel sub-pixel PX3, the second panel sub-pixel PX2 is defined as a first panel sub-pixel, and the third panel sub-pixel PX3 is defined as a second panel sub-pixel. In the adjacent third panel sub-pixel PX3 and fourth panel sub-pixel PX4, the third panel sub-pixel PX3 is defined as a first panel sub-pixel, and the fourth panel sub-pixel PX4 is defined as a second panel sub-pixel. In the adjacent fourth panel sub-pixel PX4 and fifth panel sub-pixel PX5, the fourth panel sub-pixel PX4 is defined as a first panel sub-pixel, and the fifth panel sub-pixel PX5 is defined as a second panel sub-pixel. In the adjacent fifth panel sub-pixel PX5 and sixth panel sub-pixel PX6, the fifth panel sub-pixel PX5 is defined as a first panel sub-pixel, and the sixth panel sub-pixel PX6 is defined as a second panel sub-pixel. In the adjacent sixth panel sub-pixel PX6 and seventh panel sub-pixel PX7, the sixth panel sub-pixel PX6 is defined as a first panel sub-pixel, and the seventh panel sub-pixel PX7 is defined as a second panel sub-pixel. In the adjacent seventh panel sub-pixel PX7 and eighth panel sub-pixel PX8, the seventh panel sub-pixel PX7 is defined as a first panel sub-pixel, and the eighth panel sub-pixel PX8 is defined as a second panel sub-pixel.

Exemplarily, the second panel sub-pixel (namely the second panel sub-pixel PX2 to the eighth panel sub-pixel PX8) may further include: a data writing circuit 111 and a conducting control circuit 112; a control end of the data writing circuit 111 is coupled with the scanning line GA, a first end of the data writing circuit 111 is coupled with the data line DA, and a second end of the data writing circuit 111 is coupled with a first end of the conducting control circuit 112; the data writing circuit 111 is configured to conduct the coupled data line DA and the conducting control circuit 112 in response to signals on the coupled scanning line GA; a control end of the conducting control circuit 112 is coupled with a storage electrode 113 in the first panel sub-pixel through the switch control circuit 200, and a second end of the switch control circuit 200 is coupled with the storage electrode 113 in the second panel sub-pixel; and the switch control circuit 200 is configured to conduct the coupled data writing circuit 111 and the storage electrode 113 in response to signals on the coupled switch control line SW.

In some examples, during specific implementation, as shown in FIG. 5, the data writing circuit 111 may include: a data writing transistor M1; and a gate of the data writing transistor M1 is used as the control end of the data writing circuit 111, a first pole of the data writing transistor M1 is used as the first end of the data writing circuit 111, and a second pole of the data writing transistor M1 is used as the second end of the data writing circuit 111.

In some examples, during specific implementation, as shown in FIG. 5, the conducting control circuit 112 may include: a conducting control transistor M2; and a gate of the conducting control transistor M2 is used as the control end of the conducting control circuit 112, a first pole of the conducting control transistor M2 is used as the first end of the conducting control circuit 112, and a second pole of the conducting control transistor M2 is used as the second end of the conducting control circuit 112.

In some examples, during specific implementation, as shown in FIG. 5, the switch control circuit 200 may include: a first switch transistor M01, a second switch transistor M02 and a switch capacitor CF;
  a gate of the first switch transistor M01 is coupled with the switch control line SW, a first pole of the first switch transistor M01 is coupled with the scanning line GA, a second pole of the first switch transistor M01 is coupled with a first electrode of the switch capacitor CF, the gate of the second switch transistor M02 and the control end of the conducting control circuit 112 in the first panel sub-pixel;
  the first pole of the second switch transistor M02 is coupled with the storage electrode 113 in the first panel sub-pixel, and the second pole of the second switch transistor M02 is coupled with the storage electrode 113 in the second panel sub-pixel; and
  a second electrode of the switch capacitor CF is coupled with a reference signal end.

In some examples, during specific implementation, as shown in FIG. 5, the first panel sub-pixel PX1 may include a data writing transistor M1 and a storage electrode 113; and a gate of the data writing transistor M1 is electrically connected with the corresponding scanning line GA, a first pole of the data writing transistor M1 is electrically connected with the corresponding data line DA, and a second pole of the data writing transistor M1 is electrically connected with the corresponding storage electrode 113.

In some examples, as shown in FIG. 5, the data writing transistor M1, the first switch transistor M01 and the second switch transistor M02 may all be N-type transistors, and the conducting control transistor M2 may be a P-type transistor. Alternatively, the data writing transistor M1, the first switch transistor M01 and the second switch transistor M02 may all be P-type transistors, and the conducting control transistor M2 may be an N-type transistor. In addition, the N-type transistor is conducted under an effect of a high level and cut off under an effect of a low level. In this way, preparation processes of the data writing transistor M1 and a frequency modulation control transistor M2 are unified, and process flows are reduced.

Exemplarily, when the data writing transistor M1 is the N-type transistor, gate cutting-off signals loaded by the scanning lines GA may be low-level signals to control the data writing transistor M1 to be cut off, and gate turning-on signals loaded by the scanning lines GA may be high-level signals to control the data writing transistor M1 to be conducted. When the data writing transistor M1 is the P-type transistor, the gate cutting-off signals loaded by the scanning lines GA may be the high-level signals to control the data writing transistor M1 to be cut off, and the gate turning-on signals loaded by the scanning lines GA may be the low-level signals to control the data writing transistor M1 to be conducted.

Exemplarily, when the first switch transistor M01 is the N-type transistor, gate cutting-off signals loaded by the switch control lines SW may be low-level signals to control the first switch transistor M01 to be cut off, and gate turning-on signals loaded by the switch control lines SW may be high-level signals to control the first switch transistor M01 to be conducted. When the first switch transistor M01 is the P-type transistor, the gate cutting-off signals loaded by the switch control lines SW may be the high-level signals to control the first switch transistor M01 to be cut off, and the gate turning-on signals loaded by the switch control lines SW may be the low-level signals to control the first switch transistor M01 to be conducted.

In some examples, the transistors mentioned in the above embodiments may all be metal oxide semiconductor (MOS) field-effect transistors, or thin film transistors (TFTs). During specific implementation, first poles of these transistors may be used as their sources, and second poles may be used as their drains. Alternatively, the first poles may be used as their drains, and the second poles may be used as their sources, which is not specifically distinguished here.

Liquid crystal display (LCD) panels have been widely used because of the characteristics of light-weight appearances, low power consumption, no radiation and the like. A working principle of the LCD panels is to change an arrangement state of liquid crystal molecules in a liquid crystal layer by changing a voltage difference between two ends of the liquid crystal layer, so as to change transparency of the liquid crystal layer to display images. During specific implementation, the display panel provided by the embodiment of the present disclosure may be a liquid crystal display panel. Specifically, the storage electrodes 113 in the panel sub-pixels may be pixel electrodes on an array substrate. In this way, data signals transmitted on the data lines DA are input into the pixel electrodes, such that a voltage is input into the pixel electrodes, and then the liquid crystal molecules are driven to rotate to display the images.

Figure 6:
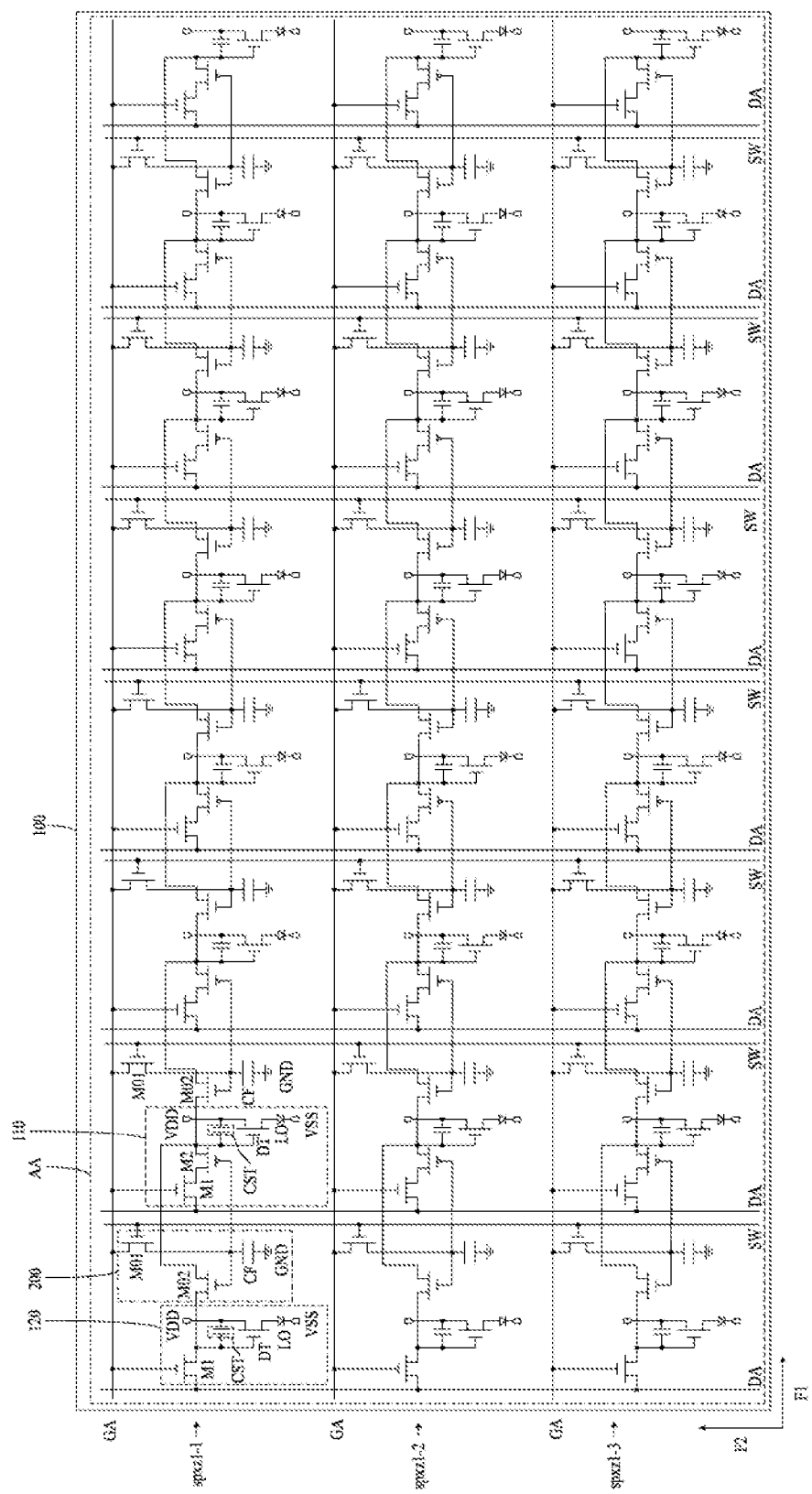
FIG. 6 is some other specific schematic structural diagrams of a display panel in an embodiment of the present disclosure.

An organic light emitting diode (OLED), a micro light emitting diode (Micro-LED), a quantum dot light emitting diode (QLED) and other electroluminescent diodes have the advantages of self light emitting, low energy consumption and the like. During specific implementation, the display panel provided by the embodiment of the present disclosure may be an electroluminescent display panel, and in the embodiment of the present disclosure, each panel sub-pixel may include an electroluminescent diode and a pixel circuit used for driving the electroluminescent diode to emit light. In addition, as shown in FIG. 6, the pixel circuit may include a driving transistor DT, a data writing transistor M1, a frequency modulation control transistor M2 and a storage capacitor CST. The storage electrode 113 in each sub-pixel in the embodiment of the present disclosure may be an electrode plate in the storage capacitor CST (for example, the storage electrode 113 may be an electrode plate electrically connected with a gate of the driving transistor DT, of the storage capacitor CST).

Figure 7:
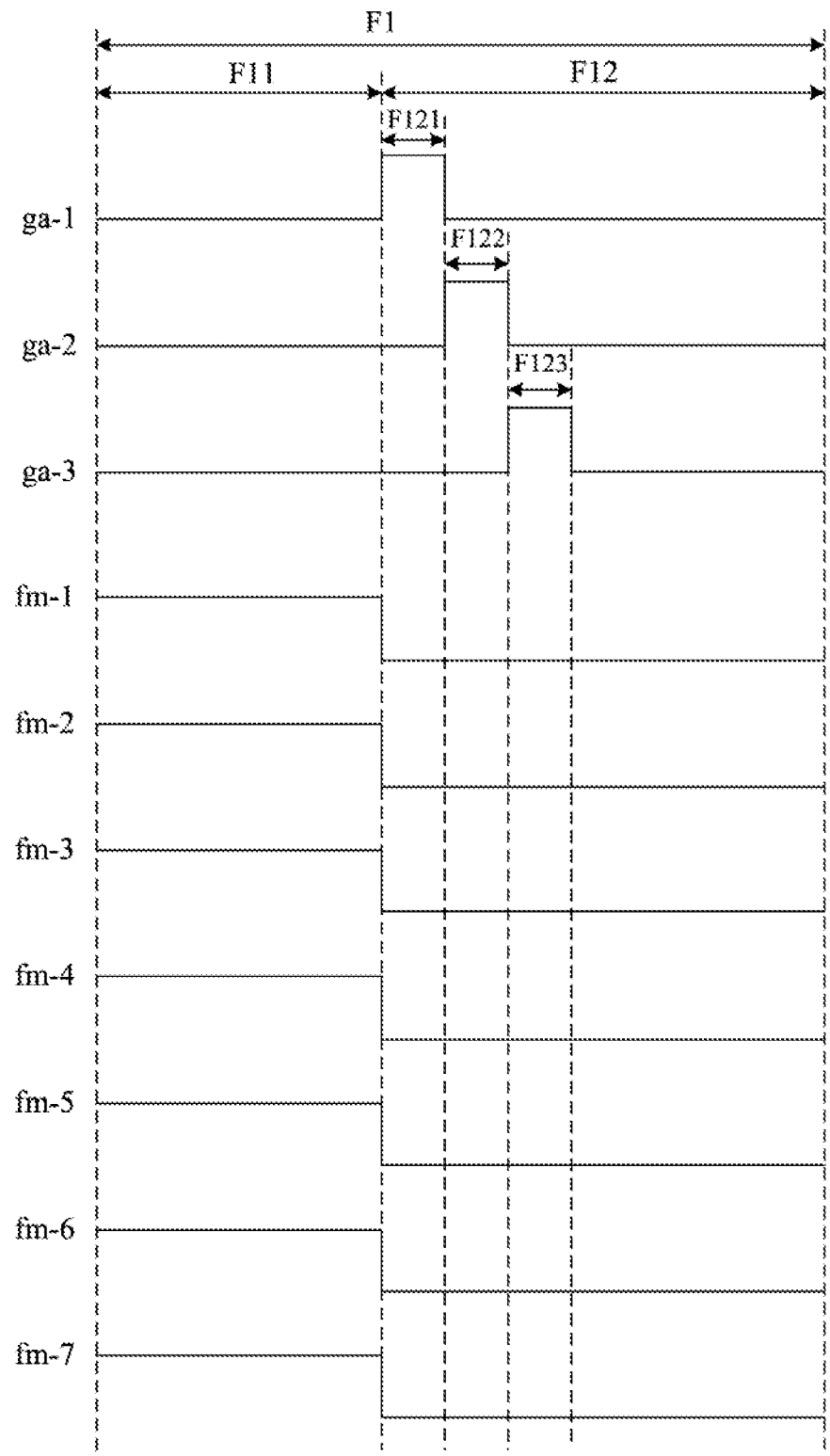
FIG. 7 is some signal time sequence diagrams in an embodiment of the present disclosure.

The display panel shown in FIG. 5 is taken as an example, and a working process of the driving method provided by the embodiment of the present disclosure is described below in conjunction with a signal sequence diagram shown in FIG. 7.

F1 represent 1 display frame, F11 represents a reset stage in the display frame, and F12 represents a data refresh stage in the display frame. F121 to F123 represent row scanning stages in the data refresh stage in the display frame.

ga-1 represents a signal transmitted on a scanning line GA corresponding to a first panel sub-pixel group spxz1-1, ga-2 represents a signal transmitted on a scanning line GA corresponding to a second panel sub-pixel group spxz1-2, and ga-3 represents a signal transmitted on a scanning line GA corresponding to a third panel sub-pixel group spxz1-3.

sw-1 represents a signal transmitted on a switch control line SW corresponding to a switch control circuit 200 between a first panel sub-pixel PX1 and a second panel sub-pixel PX2 in the panel sub-pixel groups spxz1-1 to spxz13, sw-2 represents a signal transmitted on a switch control line SW corresponding to a switch control circuit 200 between the second panel sub-pixel PX2 and a third panel sub-pixel PX3 in the panel sub-pixel groups spxz1-1 to spxz1-3, sw-3 represents a signal transmitted on a switch control line SW corresponding to a switch control circuit 200 between the third panel sub-pixel PX3 and a fourth panel sub-pixel PX4 in the panel sub-pixel groups spxz1-1 to spxz1-3, sw-4 represents a signal transmitted on a switch control line SW corresponding to a switch control circuit 200 between the fourth panel sub-pixel PX4 and a fifth panel sub-pixel PX5 in the panel sub-pixel groups spxz1-1 to spxz1-3, sw-5 represents a signal transmitted on a switch control line SW corresponding to a switch control circuit 200 between the fifth panel sub-pixel PX5 and a sixth panel sub-pixel PX6 in the panel sub-pixel groups spxz1-1 to spxz1-3, sw-6 represents a signal transmitted on a switch control line SW corresponding to a switch control circuit 200 between the sixth panel sub-pixel PX6 and a seventh panel sub-pixel PX7 in the panel sub-pixel groups spxz1-1 to spxz1-3, and sw-7 represents a signal transmitted on a switch control line SW corresponding to a switch control circuit 200 between the seventh panel sub-pixel PX7 and an eighth panel sub-pixel PX8 in the panel sub-pixel groups spxz1-1 to spxz1-3.

In the reset stage F11, a gate cutting-off signal is loaded on each scanning line GA, and a gate turning-on signal is loaded on each switch control line SW to control each switch control circuit 200 to disconnect storage electrodes 113 in two coupled panel sub-pixels.

In some embodiments, the gate cutting-off signals (namely low-level signals in the signals ga-1 to ga-3) are loaded on each scanning line GA, the gate turning-on signals (namely high-level signals in the signals sw-1 to sw-8) are loaded on each switch control line SW, and the first switch transistors M01 in all the panel sub-pixels are all conducted. The gate cutting-off signal loaded by the scanning lines GA is provided by the conducted first switch transistor M01 to the gate of the coupled second switch transistor M02 and the gate of the conducting control transistor M2, which may control the second switch transistor M02 to be cut off and control the conducting control transistor M2 to be conducted. In this way, the storage electrodes 113 in the adjacent panel sub-pixels in the same panel sub-pixel group may be disconnected.

In the data refresh stage F12, gate turning-on signals are loaded on the scanning lines GA one by one, a gate cutting-off signal is loaded on each switch control line SW, and the target gray scale data is loaded on each data line DA, such that the corresponding target gray scale data is input into the storage electrodes 113 of each panel sub-pixel.

In some embodiments, in the row scanning stage F121, the gate turning-on signal (such as a high-level signal in the signal ga-1) is loaded on the scanning line GA corresponding to the first panel sub-pixel group spxz1-1, and the gate cutting-off signals (such as low-level signals in the signals ga-2 and ga-3) are loaded on the scanning lines GA corresponding to the second panel sub-pixel group spxz1-2 and the third panel sub-pixel group spxz1-3, so as to control the data writing transistor M1 in the first panel sub-pixel group spxz1-1 to be conducted, and control the data writing transistors M1 in the second panel sub-pixel group spxz1-2 and the third panel sub-pixel group spxz1-3 to be cut off. In addition, gate cutting-off signals (namely low-level signals in the signals sw-1 to sw-8) are loaded on each switch control line SW, so as to control each first switch transistor M01 to be cut off. Therefore, each second switch transistor M02 is cut off under the control of the low-level signals stored in the switch capacitor CF, and each conducting control transistor M2 is conducted under the control of the low-level signals stored in the switch capacitor CF. In this way, the storage electrodes 113 in all the panel sub-pixels may be disconnected from one another, and the storage electrodes 113 in the first panel sub-pixel group spxz1-1 may be conducted with the data lines DA through the conducted data writing transistor M1 and the conducting control transistor M2. In addition, target gray scale data is loaded on each data line DA, such that the corresponding target gray scale data is input into the storage electrodes 113 of each panel sub-pixel in the first panel sub-pixel group spxz1-1.

In the row scanning stage F122, the gate turning-on signal (such as a high-level signal in the signal ga-2) is loaded on the scanning line GA corresponding to the second panel sub-pixel group spxz1-2, and the gate cutting-off signals (such as low-level signals in the signals ga-1 and ga-3) are loaded on the scanning lines GA corresponding to the first panel sub-pixel group spxz1-1 and the third panel sub-pixel group spxz1-3, so as to control the data writing transistor M1 in the second panel sub-pixel group spxz1-2 to be conducted, and control the data writing transistors M1 in the first panel sub-pixel group spxz1-1 and the third panel sub-pixel group spxz1-3 to be cut off. In addition, gate cutting-off signals (namely low-level signals in the signals sw-1 to sw-8) are loaded on each switch control line SW, so as to control each first switch transistor M01 to be cut off. Therefore, each second switch transistor M02 is cut off under the control of the low-level signals stored in the switch capacitor CF, and each conducting control transistor M2 is conducted under the control of the low-level signals stored in the switch capacitor CF. In this way, the storage electrodes 113 in all the panel sub-pixels may be disconnected from one another, and the storage electrodes 113 in the second panel sub-pixel group spxz1-2 may be conducted with the data lines DA through the conducted data writing transistor M1 and the conducting control transistor M2. In addition, target gray scale data is loaded on each data line DA, such that the corresponding target gray scale data is input into the storage electrode 113 of each panel sub-pixel in the second panel sub-pixel group spxz1-2.

In the row scanning stage F123, the gate turning-on signal (such as a high-level signal in the signal ga-3) is loaded on the scanning line GA corresponding to the third panel sub-pixel group spxz1-3, and the gate cutting-off signals (such as low-level signals in the signals ga-1 and ga-2) are loaded on the scanning lines GA corresponding to the first panel sub-pixel group spxz1-1 and the second panel sub-pixel group spxz1-2, so as to control the data writing transistor M1 in the third panel sub-pixel group spxz1-3 to be conducted, and control the data writing transistors M1 in the first panel sub-pixel group spxz1-1 and the second panel sub-pixel group spxz1-2 to be cut off. In addition, gate cutting-off signals (namely low-level signals in the signals sw-1 to sw-8) are loaded on each switch control line SW, so as to control each first switch transistor M01 to be cut off. Therefore, each second switch transistor M02 is cut off under the control of the low-level signals stored in the switch capacitor CF, and each conducting control transistor M2 is conducted under the control of the low-level signals stored in the switch capacitor CF. In this way, the storage electrodes 113 in all the panel sub-pixel may be disconnected from one another, and the storage electrodes 113 in the third panel sub-pixel group spxz1-3 may be conducted with the data lines DA through the conducted data writing transistor M1 and the conducting control transistor M2. In addition, target gray scale data is loaded on each data line DA, such that the corresponding target gray scale data is input into the storage electrodes 113 of each panel sub-pixel in the third panel sub-pixel group spxz1-3.

An embodiment of the present disclosure provides a driving method of some other display panels, and transformation is performed for the implementations in the above embodiments. Only the difference between the present embodiment and the above embodiments is explained below, and similarities are omitted here.

In some examples, during specific implementation, the determining the target gray scale data corresponding to the other panel sub-pixels in each adjustment area according to the initial gray scale data corresponding to each adjustment area, specifically may include:

as for each adjustment area, the target gray scale data corresponding to the other panel sub-pixels in the adjustment area may be determined according to the following formula;

$$d_n = da_{00} * \beta_n + \gamma_n;$$

wherein, n represents an $n^{th}$ panel sub-pixel of the other panel sub-pixels in the adjustment area, $da_n$ represents target gray scale data corresponding to the $n^{th}$ panel sub-pixel, $da_{00}$ represents the initial gray scale data corresponding to the adjustment area, and $\beta_n$ and $\gamma_n$ represent parameters corresponding to the pre-determined $n^{th}$ panel sub-pixel respectively.

In some examples, as for the other panel sub-pixels in each adjustment area, each panel sub-pixel in the other panel sub-pixels is in one-to-one correspondence with a $\beta_n$ and a $\gamma_n$. Exemplarily, $\beta_n$ corresponding to the other panel sub-pixels in each adjustment area may be different, and $\gamma_n$ corresponding to the other panel sub-pixels in each adjustment area may be different. Alternatively, $\beta_n$ corresponding to the $n^{th}$ panel sub-pixel in the other panel sub-pixels in each adjustment area may be the same, $\gamma_n$ corresponding to the $n^{th}$ panel sub-pixel in the other panel sub-pixels in each adjustment area may be the same, $\beta_n$ corresponding to each panel sub-pixel in the other panel sub-pixels in the same adjustment area may be different, and $\gamma_n$ corresponding to each panel sub-pixel in the other panel sub-pixels in the same adjustment area may be different.

In some examples, $\beta_n$ and $\gamma_n$ may be determined according to experience. Alternatively, $\beta_n$ and $\gamma_n$ may also be determined according to a plurality of tests. Of course, in practical applications, specific values of $\beta_n$ and $\gamma_n$ may be determined according to the needs of the practical applications, which is not limited here.

The driving method of the display panel provided by the present disclosure is illustrated below through specific embodiments. The driving method of the display panel provided by the embodiment of the present disclosure may include the following steps:

(1), initial image data of a to-be-displayed frame is received. A resolution of an initial image corresponding to the initial image data is smaller than a resolution of the display panel;

(2), taking M=4 as an example, it is determined that the total quantity of image sub-pixel groups in the initial image is the same as the total quantity of panel sub-pixel groups in the display panel according to the resolution of the initial image and the resolution of the display panel, and the total quantity of panel sub-pixels in a panel sub-pixel group is 4 times the total quantity of image sub-pixels in an image sub-pixel group.

Exemplarily, the resolution of the display panel is A1*B1, A1 represents the total quantity of the panel sub-pixels in a panel sub-pixel group, and B1 represents the total quantity of the panel sub-pixel groups. The resolution of the initial image may be A2*B2, A2 represents the total quantity of the image sub-pixels in an image sub-pixel group, and B2 represents the total quantity of the image sub-pixel groups. The total quantity of the image sub-pixel groups in the initial image is the same as the total quantity of the panel sub-pixel groups in the display panel, which may mean that B1 is the same as B2. For example, as shown in FIG. 1 and FIG. 4, the initial image has image sub-pixel groups spxz2-1 to spxz2-9, with a total of 9 image sub-pixel groups. The display panel has panel sub-pixel groups spxz1-1 to spxz1-9, with a total of 9 panel sub-pixel groups. It may be explained that B1 is the same as B2.

Exemplarily, the total quantity of the panel sub-pixels in a panel sub-pixel group is M times the total quantity of the image sub-pixels in an image sub-pixel group, which may mean that A1/A2=M. For example, as shown in FIG. 4, the first panel sub-pixel group spxz1-1 and the first image sub-pixel group spxz2-1 are taken as examples for illustration. The first panel sub-pixel group spxz1-1 has 12 panel sub-pixels, the first image sub-pixel group spxz2-1 has 3 image sub-pixels, and the total quantity of the panel sub-pixels in the first panel sub-pixel group spxz1-1 is 4 times the total quantity of the panel sub-pixels in the first panel sub-pixel group spxz1-1.

(3) 4 adjacent panel sub-pixels in each panel sub-pixel group are divided into an adjustment area, such that an adjustment area corresponds to an image sub-pixel.

For example, as shown in FIG. 4, the first panel sub-pixel group spxz1-1 is taken as an example for illustration. The first panel sub-pixel group spxz1-1 may have 3 adjustment areas TZB1, TZB2 and TZB3. The 3 adjustment areas TZB1, TZB2 and TZB3 may include 4 panel sub-pixels. In addition, the adjustment area TZB1 corresponds to an image sub-pixel R1 in the first image sub-pixel group spxz2-1, the adjustment area TZB2 corresponds to an image sub-pixel R2 in the first image sub-pixel group spxz2-1, and the adjustment area TZB3 corresponds to an image sub-pixel R3 in the first image sub-pixel group spxz2-1.

(4) each piece of initial gray scale data is determined as the target gray scale data corresponding to a panel sub-pixel in the corresponding adjustment area.

For example, as shown in FIG. 4, the target gray scale data of a panel sub-pixel R1-1 in the adjustment area TZB1 is the initial gray scale data of the image sub-pixel R1. The target gray scale data of the panel sub-pixel R2-1 in the adjustment area TZB2 is the initial gray scale data of the image sub-pixel R2. The target gray scale data of the panel sub-pixel R3-1 in the adjustment area TZB3 is the initial gray scale data of the image sub-pixel R3.

(5) as for each adjustment area, the target gray scale data corresponding to the other panel sub-pixels in the adjustment area may be determined according to a formula of $da_n = da_{00}*\beta_n + \gamma_n$.

For example, with reference to FIG. 4, taking a situation that the panel sub-pixel R1-2 corresponds to $\beta_1'$ and $\gamma_1'$, the panel sub-pixel R1-3 corresponds to $\beta_2'$ and $\gamma_2'$, and the panel sub-pixel R1-4 corresponds to $\beta_3'$ and $\gamma_3'$ as an example, the panel sub-pixel R1-2 is used as a first panel sub-pixel in the adjustment area TZB1, and then the target gray scale data $da_1$ corresponding to the panel sub-pixel R1-2=$da_{00}*\beta_1'+\gamma_1'$. The panel sub-pixel R1-3 is used as a second panel sub-pixel in the adjustment area TZB1, and then the target gray scale data $da_2$ corresponding to the panel sub-pixel R1-3=$da_{00}*\beta_2'+\gamma_2'$. The panel sub-pixel R1-4 is used as a third panel sub-pixel in the adjustment area TZB1, and the target gray scale data das corresponding to the panel sub-pixel R1-4=$da_{00}*\beta_3'+\gamma_3'$. For example, $da_{00}$=255, then, $da_1$=255*$\beta_1'+\gamma_1'$, $da_2$=255*$\beta_2'+\gamma_2'$, and $da_3$=255*$\beta_3'+\gamma_3'$.

With reference to FIG. 4, taking a situation that the panel sub-pixel R2-2 corresponds to $\beta_1''$ and $\gamma_1''$, the panel sub-pixel R2-3 corresponds to $\beta_2''$ and $\gamma_2''$, and the panel sub-pixel R2-4 corresponds to $\beta_3''$ and $\gamma_3''$ as an example, the panel sub-pixel R2-2 is used as a first panel sub-pixel in the adjustment area TZB2, and then the target gray scale data $da_1$ corresponding to the panel sub-pixel R2-2=$da_{00}*\beta_1''+\gamma_1''$. The panel sub-pixel R2-3 is used as a second panel sub-pixel in the adjustment area TZB2, and then the target gray scale data $da_2$ corresponding to the panel sub-pixel R2-3=$da_{00}*\beta_2''+\gamma_2''$. The panel sub-pixel R2-4 is used as a third panel sub-pixel in the adjustment area TZB2, and the target gray scale data $da_3$ corresponding to the panel sub-pixel R2-4=$da_{00}*\beta_3''+\gamma_3''$. For example, $da_{00}$=251, then, $da_1$=251*$\beta_1''+\gamma_1''$, $da_2$=251*$\beta_2''+\gamma_2''$, and $da_3$=251*$\beta_3''+\gamma_3''$.

(6) the display panel is driven to display according to the target gray scale data. When the target gray scale data corresponding to each panel sub-pixel in the other panel sub-pixels is different, the driving the display panel to display according to the target gray scale data, specifically may include:

a gate cutting-off signal is loaded on each scanning line GA, and a gate turning-on signal is loaded on each switch control line SW to control each switch control circuit 200 to disconnect storage electrodes 113 in two coupled panel sub-pixels; and gate turning-on signals are loaded on the scanning lines GA one by one, a gate cutting-off signal is loaded on each switch control line SW, and the target gray scale data is loaded on each data line DA, such that the corresponding target gray scale data is input into the storage electrodes 113 of each panel sub-pixel.

A working process of step (6) in embodiments may refer to the working process of step (8) in the above embodiments, which is not specifically repeated here.

An embodiment of the present disclosure provides a driving method of yet some other display panels, and transformation is performed for the implementations in the above embodiments. Only the difference between the present embodiment and the above embodiments is explained below, and similarities are omitted here.

In some examples, during specific implementation, the determining the target gray scale data corresponding to each panel sub-pixel in each adjustment area according to the initial gray scale data of the image sub-pixel corresponding to each adjustment area, specifically may include: each piece of initial gray scale data is determined as the target gray scale data corresponding to each panel sub-pixel in the corresponding adjustment area, such that the target gray scale data corresponding to each panel sub-pixel in the adjustment area is the same.

Exemplarily, as shown in FIG. 4, the target gray scale data of panel sub-pixels R1-1 to R1-4 in the adjustment area TZB1 is the initial gray scale data of an image sub-pixel R1. The target gray scale data of panel sub-pixels R2-1 to R2-4 in the adjustment area TZB2 is the initial gray scale data of an image sub-pixel R2. The target gray scale data of panel sub-pixels R3-1 to R3-4 in the adjustment area TZB3 is the initial gray scale data of an image sub-pixel R3.

The driving method of the display panel provided by the present disclosure is illustrated below through specific embodiments. The driving method of the display panel provided by the embodiment of the present disclosure may include the following steps:

(1) initial image data of a to-be-displayed frame is received. A resolution of an initial image corresponding to the initial image data is smaller than a resolution of the display panel;

(2) taking M=4 as an example, it is determined that the total quantity of image sub-pixel groups in the initial image is the same as the total quantity of panel sub-pixel groups in the display panel according to the resolution of the initial image and the resolution of the display panel, and the total quantity of panel sub-pixels in a panel sub-pixel group is 4 times the total quantity of image sub-pixels in an image sub-pixel group.

Exemplarily, the resolution of the display panel is A1*B1, A1 represents the total quantity of the panel sub-pixels in a panel sub-pixel group, and B1 represents the total quantity of the panel sub-pixel groups. The resolution of the initial image may be A2*B2, A2 represents the total quantity of the image sub-pixels in an image sub-pixel group, and B2 represents the total quantity of the image sub-pixel groups. The total quantity of the image sub-pixel groups in the initial image is the same as the total quantity of the panel sub-pixel groups in the display panel, which may mean that B1 is the same as B2. For example, as shown in FIG. 1 and FIG. 4, the initial image has image sub-pixel groups spxz2-1 to spxz2-9, with a total of 9 image sub-pixel groups. The display panel has panel sub-pixel groups spxz1-1 to spxz1-9, with a total of 9 panel sub-pixel groups. It may be explained that B1 is the same as B2.

Exemplarily, the total quantity of the panel sub-pixels in a panel sub-pixel group is M times the total quantity of the image sub-pixels in an image sub-pixel group, which may mean that A1/A2=M. For example, as shown in FIG. 4, the first panel sub-pixel group spxz1-1 and the first image sub-pixel group spxz2-1 are taken as examples for illustration. The first panel sub-pixel group spxz1-1 has 12 panel sub-pixels, the first image sub-pixel group spxz2-1 has 3 image sub-pixels, and the total quantity of the panel sub-pixels in the first panel sub-pixel group spxz1-1 is 4 times the total quantity of the panel sub-pixels in the first panel sub-pixel group spxz1-1.

(3) 4 adjacent panel sub-pixels in each panel sub-pixel group are divided into an adjustment area, such that an adjustment area corresponds to an image sub-pixel.

For example, as shown in FIG. 4, the first panel sub-pixel group spxz1-1 is taken as an example for illustration. The first panel sub-pixel group spxz1-1 may have 3 adjustment areas TZB1, TZB2 and TZB3. The 3 adjustment areas TZB1, TZB2 and TZB3 may include 4 panel sub-pixels. In addition, the adjustment area TZB1 corresponds to an image sub-pixel R1 in the first image sub-pixel group spxz2-1, the adjustment area TZB2 corresponds to an image sub-pixel R2 in the first image sub-pixel group spxz2-1, and the adjustment area TZB3 corresponds to an image sub-pixel R3 in the first image sub-pixel group spxz2-1.

(4) the target gray scale data of the panel sub-pixels R1-1 to R1-4 in the adjustment area TZB1 is the initial image data of the image sub-pixel R1. The target gray scale data of panel sub-pixels R2-1 to R2-4 in the adjustment area TZB2 is the initial gray scale data of an image sub-pixel R2. The target gray scale data of panel sub-pixels R3-1 to R3-4 in the adjustment area TZB3 is the initial gray scale data of an image sub-pixel R3.

In the same adjustment area, the target gray scale data corresponding to each panel sub-pixel is the same.

(5) the display panel is driven to display according to the target gray scale data.

Exemplarily, the driving the display panel to display according to the target gray scale data, specifically may include:

a gate cutting-off signal is loaded on each scanning line GA, and a gate turning-on signal is loaded on each switch control line SW to control each switch control circuit 200 to disconnect storage electrodes 113 in two coupled panel sub-pixels; and gate turning-on signals are loaded on the scanning lines GA one by one, and the target gray scale data is loaded on the data line DA corresponding to a panel sub-pixel in each adjustment area, such that the corresponding target gray scale data is input into the storage electrode 113 of each panel sub-pixel, wherein when the gate turning-on signal is loaded on the scanning line GA corresponding to a panel sub-pixel group, the gate cutting-off signal is loaded on the switch control line SW corresponding to the switch control circuit 200 between every two adjacent panel sub-pixels which are in the panel sub-pixel group and located in different adjustment areas, and the switch control circuit 200 is controlled to disconnect the storage electrodes 113 in the two coupled panel sub-pixels; and the gate turning-on signal is loaded on the switch control line SW corresponding to the switch control circuit 200 between every two adjacent panel sub-pixels which are in the panel sub-pixel group and located in the same adjustment area, and the switch control circuit 200 is controlled to conduct the storage electrodes 113 in the two coupled panel sub-pixels.

Figure 8:
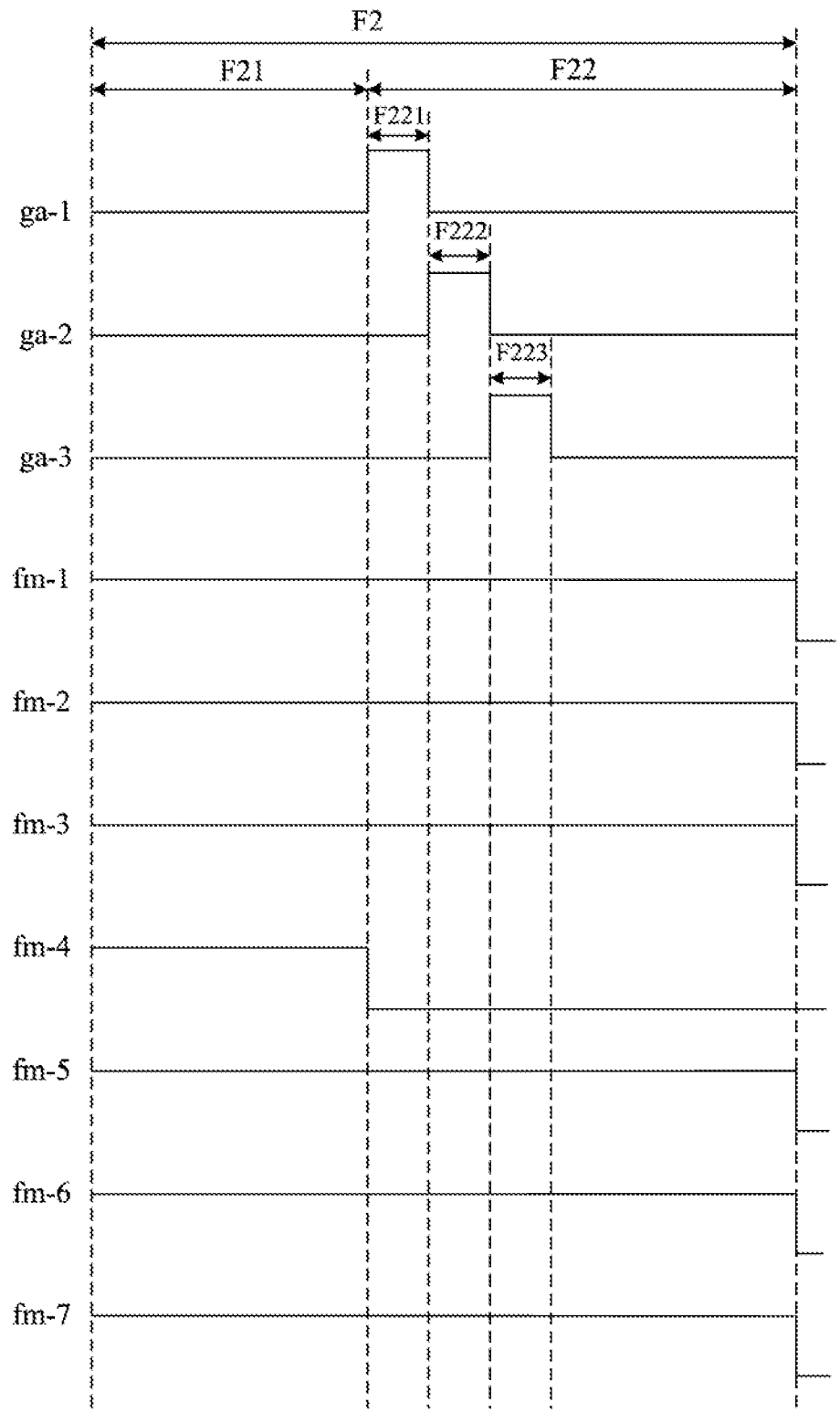
FIG. 8 is some other signal sequence diagrams in an embodiment of the present disclosure.

The display panel shown in FIG. 5 is taken as an example, and a working process of the driving method provided by the embodiment of the present disclosure is described below in conjunction with a signal sequence diagram shown in FIG. 8.

F2 represents 1 display frame, F21 represents a reset stage in the display frame, and F22 represents a data refresh stage in the display frame. F221 to F223 represent row scanning stages in the data refresh stage in the display frame.

ga-1 represents a signal transmitted on a scanning line GA corresponding to a first panel sub-pixel group spxz1-1, ga-2 represents a signal transmitted on a scanning line GA corresponding to a second panel sub-pixel group spxz1-2, and ga-3 represents a signal transmitted on a scanning line GA corresponding to a third panel sub-pixel group spxz1-3.

sw-1 represents a signal transmitted on a switch control line SW corresponding to a switch control circuit 200 between a first panel sub-pixel PX1 and a second panel sub-pixel PX2 in the panel sub-pixel groups spxz1-1 to spxz1-3, sw-2 represents a signal transmitted on a switch control line SW corresponding to a switch control circuit 200 between the second panel sub-pixel PX2 and a third panel sub-pixel PX3 in the panel sub-pixel groups spxz1-1 to spxz1-3, sw-3 represents a signal transmitted on a switch control line SW corresponding to a switch control circuit 200 between the third panel sub-pixel PX3 and a fourth panel sub-pixel PX4 in the panel sub-pixel groups spxz1-1 to spxz1-3, sw-4 represents a signal transmitted on a switch control line SW corresponding to a switch control circuit 200 between the fourth panel sub-pixel PX4 and a fifth panel sub-pixel PX5 in the panel sub-pixel groups spxz1-1 to spxz1-3, sw-5 represents a signal transmitted on a switch control line SW corresponding to a switch control circuit 200 between the fifth panel sub-pixel PX5 and a sixth panel sub-pixel PX6 in the panel sub-pixel groups spxz1-1 to spxz1-3, sw-6 represents a signal transmitted on a switch control line SW corresponding to a switch control circuit 200 between the sixth panel sub-pixel PX6 and a seventh panel sub-pixel PX7 in the panel sub-pixel groups spxz1-1 to spxz1-3, and sw-7 represents a signal transmitted on a switch control line SW corresponding to a switch control circuit 200 between the seventh panel sub-pixel PX7 and an eighth panel sub-pixel PX8 in the panel sub-pixel groups spxz1-1 to spxz1-3.

In the reset stage F21, a gate cutting-off signal is loaded on each scanning line GA, and a gate turning-on signal is loaded on each switch control line SW to control each switch control circuit 200 to disconnect storage electrodes 113 in two coupled panel sub-pixels.

In some embodiments, the gate cutting-off signals (namely low-level signals in the signals ga-1 to ga-3) are loaded on each scanning line GA, the gate turning-on signals (namely high-level signals in the signals sw-1 to sw-8) are loaded on each switch control line SW, and the first switch transistors M01 in all the panel sub-pixels are all conducted. The gate cutting-off signal loaded by the scanning lines GA is provided by the conducted first switch transistor M01 to the gate of the coupled second switch transistor M02 and the gate of the conducting control transistor M2, which may control the second switch transistor M02 to be cut off and control the conducting control transistor M2 to be conducted. In this way, the storage electrodes 113 in the adjacent panel sub-pixels in the same panel sub-pixel group may be disconnected.

In the data refresh stage F22, gate turning-on signals are loaded on the scanning lines GA one by one, and the target gray scale data is loaded the data line DA corresponding to a panel sub-pixel in each adjustment area, such that the corresponding target gray scale data is input into the storage electrode 113 of each panel sub-pixel.

In some embodiments, in the row scanning stage F221, the gate turning-on signal (such as a high-level signal in the signal ga-1) is loaded on the scanning line GA corresponding to the first panel sub-pixel group spxz1-1, and the gate cutting-off signals (such as low-level signals in the signals ga-2 and ga-3) are loaded on the scanning lines GA corresponding to the second panel sub-pixel group spxz1-2 and the third panel sub-pixel group spxz1-3, so as to control the data writing transistor M1 in the first panel sub-pixel group spxz1-1 to be conducted, and control the data writing transistors M1 in the second panel sub-pixel group spxz1-2 and the third panel sub-pixel group spxz1-3 to be cut off.

In addition, a gate cutting-off signal (namely a low-level signal in the signal sw-4) is loaded on the switch control line SW corresponding to the switch control circuit 200 between the fourth panel sub-pixel and the fifth panel sub-pixel, so as to control the first switch transistor M01 in the switch control circuit 200 between the fourth panel sub-pixel and the fifth panel sub-pixel to be cut off, such that the second switch transistor M02 in the switch control circuit 200 between the fourth panel sub-pixel and the fifth panel sub-pixel is cut off under the control of the low-level signal stored in the switch capacitor CF. In this way, the storage electrodes 113 in the fourth panel sub-pixel and the fifth panel sub-pixel in each panel sub-pixel group may be disconnected from one another.

In addition, gate turning-on signals (namely high-level signals in the signals sw-1 to sw-3 and high-level signals in the signals sw-5 to sw-7) are loaded on the switch control line SW corresponding to the switch control circuit 200 between every two adjacent panel sub-pixels in the same adjustment area, such that the first switch transistor M01 in the switch control circuit 200 among the first panel sub-pixel PX1 to the fourth panel sub-pixel PX4 is conducted, and the first switch transistor M01 in the switch control circuit 200 among the fifth panel sub-pixel PX5 to the eighth panel sub-pixel PX8 is conducted. In the first panel sub-pixel group spxz1-1, the high-level signal in the signal ga-1 may be provided by the conducted first switch transistor M01 to the coupled second switch transistor M02 and the conducting control transistor M2, such that the second switch transistor M02 is conducted, and the conducting control transistor M2 is cut off. That is, the second switch transistor M02 in the switch control circuit 200 among the first panel sub-pixel PX1 to the fourth panel sub-pixel PX4 is conducted, such that the storage electrodes 113 of the first panel sub-pixel PX1 to the fourth panel sub-pixel PX4 may be conducted. The second switch transistor M02 in the switch control circuit 200 among the fifth panel sub-pixel PX5 to the eighth panel sub-pixel PX8 is conducted, such that the storage electrodes 113 of the fifth panel sub-pixel PX5 to the eighth panel sub-pixel PX8 may be conducted. In addition, the target gray scale data is loaded on a data line DA corresponding to each adjustment area, so that the target gray scale data may be input into a target sub-pixel in each adjustment area. For example, the target gray scale data is input into the second panel sub-pixel PX2, so that the target gray scale data may be input into the storage electrodes 113 among the first panel sub-pixel PX1 to the fourth panel sub-pixel PX4 in the first panel sub-pixel group spxz1-1. The target gray scale data is input into the storage electrodes 113 among the fifth panel sub-pixel PX5 to the eighth panel sub-pixel PX8 in the first panel sub-pixel group spxz1-1.

In addition, in the second panel sub-pixel group spxz1-2, the low-level signal in the signal ga-2 may be provided by the conducted first switch transistor M01 to the coupled second switch transistor M02 and the conducting control transistor M2, such that the second switch transistor M02 is cut off. In the third panel sub-pixel group spxz1-3, the low-level signal in the signal ga-3 may be provided by the conducted first switch transistor M01 to the coupled second switch transistor M02 and the conducting control transistor M2, such that the second switch transistor M02 is cut off.

In the row scanning stage F222, the gate turning-on signal (such as a high-level signal in the signal ga-2) is loaded on the scanning line GA corresponding to the second panel sub-pixel group spxz1-2, and the gate cutting-off signals (such as low-level signals in the signals ga-1 and ga-3) are loaded on the scanning lines GA corresponding to the first panel sub-pixel group spxz1-1 and the third panel sub-pixel group spxz1-3, so as to control the data writing transistor M1 in the second panel sub-pixel group spxz1-2 to conducted, and control the data writing transistors M1 in the first panel sub-pixel group spxz1-1 and the third panel sub-pixel group spxz1-3 to be cut off.

In addition, a gate cutting-off signal (namely a low-level signal in the signal sw-4) is loaded on the switch control line SW corresponding to the switch control circuit 200 between the fourth panel sub-pixel and the fifth panel sub-pixel, so as to control the first switch transistor M01 in the switch control circuit 200 between the fourth panel sub-pixel and the fifth panel sub-pixel to be cut off, such that the second switch transistor M02 in the switch control circuit 200 between the fourth panel sub-pixel and the fifth panel sub-pixel is cut off under the control of the low-level signal stored in the switch capacitor CF, In this way, the storage electrodes 113 in the fourth panel sub-pixel and the fifth panel sub-pixel in each panel sub-pixel group may be disconnected from one another.

In addition, gate turning-on signals (namely high-level signals in the signals sw-1 to sw-3 and high-level signals in the signals sw-5 to sw-7) are loaded on the switch control line SW corresponding to the switch control circuit 200 between every two adjacent panel sub-pixels in the same adjustment area, such that the first switch transistor M01 in the switch control circuit 200 among the first panel sub-pixel PX1 to the fourth panel sub-pixel PX4 is conducted, and the first switch transistor M01 in the switch control circuit 200 among the fifth panel sub-pixel PX5 to the eighth panel sub-pixel PX8 is conducted. In the first panel sub-pixel group spxz1-1, the high-level signal in the signal ga-1 may be provided by the conducted first switch transistor M01 to the coupled second switch transistor M02 and the conducting control transistor M2, such that the second switch transistor M02 is conducted, and the conducting control transistor M2 is cut off. That is, the second switch transistor M02 in the switch control circuit 200 among the first panel sub-pixel PX1 to the fourth panel sub-pixel PX4 is conducted, such that the storage electrodes 113 of the first panel sub-pixel PX1 to the fourth panel sub-pixel PX4 may be conducted. The second switch transistor M02 in the switch control circuit 200 among the fifth panel sub-pixel PX5 to the eighth panel sub-pixel PX8 is conducted, such that the storage electrodes 113 of the fifth panel sub-pixel PX5 to the eighth panel sub-pixel PX8 may be conducted. In addition, the target gray scale data is loaded on a data line DA corresponding to each adjustment area, so that the target gray scale data may be input into a target sub-pixel in each adjustment area. For example, the target gray scale data is input into the second panel sub-pixel PX2, so that the target gray scale data may be input into the storage electrodes 113 among the first panel sub-pixel PX1 to the fourth panel sub-pixel PX4 in the second panel sub-pixel group spxz1-2. The target gray scale data is input into the storage electrodes 113 among the fifth panel sub-pixel PX5 to the eighth panel sub-pixel PX8 in the second panel sub-pixel group spxz1-2.

In addition, in the first panel sub-pixel group spxz1-1, the low-level signal in the signal ga-1 may be provided by the conducted first switch transistor M01 to the coupled second switch transistor M02 and the conducting control transistor M2, such that the second switch transistor M02 is cut off. In the third panel sub-pixel group spxz1-3, the low-level signal in the signal ga-3 may be provided by the conducted first switch transistor M01 to the coupled second switch transistor M02 and the conducting control transistor M2, such that the second switch transistor M02 is cut off.

In the row scanning stage F223, the gate turning-on signal (such as a high-level signal in the signal ga-3) is loaded on the scanning line GA corresponding to the third panel sub-pixel group spxz1-3, and the gate cutting-off signals (such as low-level signals in the signals ga-1 and ga-2) are loaded on the scanning lines GA corresponding to the first panel sub-pixel group spxz1-1 and the second panel sub-pixel group spxz12, so as to control the data writing transistor M1 in the third panel sub-pixel group spxz1-3 to be conducted, and control the data writing transistors M1 in the first panel sub-pixel group spxz1-1 and the second panel sub-pixel group spxz1-2 to be cut off.

In addition, a gate cutting-off signal (namely a low-level signal in the signal sw-4) is loaded on the switch control line SW corresponding to the switch control circuit 200 between the fourth panel sub-pixel and the fifth panel sub-pixel, so as to control the first switch transistor M01 in the switch control circuit 200 between the fourth panel sub-pixel and the fifth panel sub-pixel to be cut off, such that the second switch transistor M02 in the switch control circuit 200 between the fourth panel sub-pixel and the fifth panel sub-pixel is cut off under the control of the low-level signal stored in the switch capacitor CF. In this way, the storage electrodes 113 in the fourth panel sub-pixel and the fifth panel sub-pixel in each panel sub-pixel group may be disconnected from one another.

In addition, gate turning-on signals (namely high-level signals in the signals sw-1 to sw-3 and high-level signals in the signals sw-5 to sw-7) are loaded on the switch control line SW corresponding to the switch control circuit 200 between every two adjacent panel sub-pixels in the same adjustment area, such that the first switch transistor M01 in the switch control circuit 200 among the first panel sub-pixel PX1 to the fourth panel sub-pixel PX4 is conducted, and the first switch transistor M01 in the switch control circuit 200 among the fifth panel sub-pixel PX5 to the eighth panel sub-pixel PX8 is conducted. In the first panel sub-pixel group spxz1-1, the high-level signal in the signal ga-1 may be provided by the conducted first switch transistor M01 to the coupled second switch transistor M02 and the conducting control transistor M2, such that the second switch transistor M02 is conducted, and the conducting control transistor M2 is cut off. That is, the second switch transistor M02 in the switch control circuit 200 among the first panel sub-pixel PX1 to the fourth panel sub-pixel PX4 is conducted, such that the storage electrodes 113 of the first panel sub-pixel PX1 to the fourth panel sub-pixel PX4 may be conducted. The second switch transistor M02 in the switch control circuit 200 among the fifth panel sub-pixel PX5 to the eighth panel sub-pixel PX8 is conducted, such that the storage electrodes 113 of the fifth panel sub-pixel PX5 to the eighth panel sub-pixel PX8 may be conducted. In addition, the target gray scale data is loaded on a data line DA corresponding to each adjustment area, so that the target gray scale data may be input into a target sub-pixel in each adjustment area. For example, the target gray scale data is input into the second panel sub-pixel PX2, so that the target gray scale data may be input into the storage electrodes 113 among the first panel sub-pixel PX1 to the fourth panel sub-pixel PX4 in the third panel sub-pixel group spxz1-3. The target gray scale data is input into the storage electrodes 113 among the fifth panel sub-pixel PX5 to the eighth panel sub-pixel PX8 in the third panel sub-pixel group spxz1-3.

In addition, in the first panel sub-pixel group spxz1-1, the low-level signal in the signal ga-1 may be provided by the conducted first switch transistor M01 to the coupled second switch transistor M02 and the conducting control transistor M2, such that the second switch transistor M02 is cut off. In the second panel sub-pixel group spxz1-2, the low-level signal in the signal ga-2 may be provided by the conducted first switch transistor M01 to the coupled second switch transistor M02 and the conducting control transistor M2, such that the second switch transistor M02 is cut off.

An embodiment of the present disclosure further provides a driving method of yet some other display panels, a panel sub-pixel group is divided into a plurality of merging areas, and each merging area includes at least two adjacent panel sub-pixels. A driving method of a display panel provided by an embodiment of the present disclosure may include:

a gate cutting-off signal is loaded on each scanning line, and a gate turning-on signal is loaded on each switch control line, to control each switch control circuit to disconnect storage electrodes in two coupled panel sub-pixels;

gate turning-on signals are loaded on the scanning lines one by one, and corresponding gray scale data is loaded on a data line corresponding to a panel sub-pixel in each merging area, such that the corresponding gray scale data is input into the storage electrode of each panel sub-pixel, wherein when the gate turning-on signal is loaded on the scanning line corresponding to a panel sub-pixel group, a gate cutting-off signal is loaded on the switch control line corresponding to the switch control circuit between every two adjacent panel sub-pixels which are in the panel sub-pixel group and located in different merging areas, and the switch control circuit is controlled to disconnect the storage electrodes in the two coupled panel sub-pixels; and the gate turning-on signal is loaded on the switch control line corresponding to the switch control circuit between every two adjacent panel sub-pixels which are in the panel sub-pixel group and located in the same merging area, and the switch control circuit is controlled to conduct the storage electrodes in the two coupled panel sub-pixels.

In some examples, in the same panel sub-pixel group, the quantity of the panel sub-pixels in each merging area may be the same, of course, the quantity of the panel sub-pixels in part of the merging areas may also be different, which is not limited here.

In some examples, in different panel sub-pixel groups, the quantity of the panel sub-pixels in each merging area may be the same, of course, the quantity of the panel sub-pixels in part of the merging areas may also be different, which is not limited here.

Figure 9:
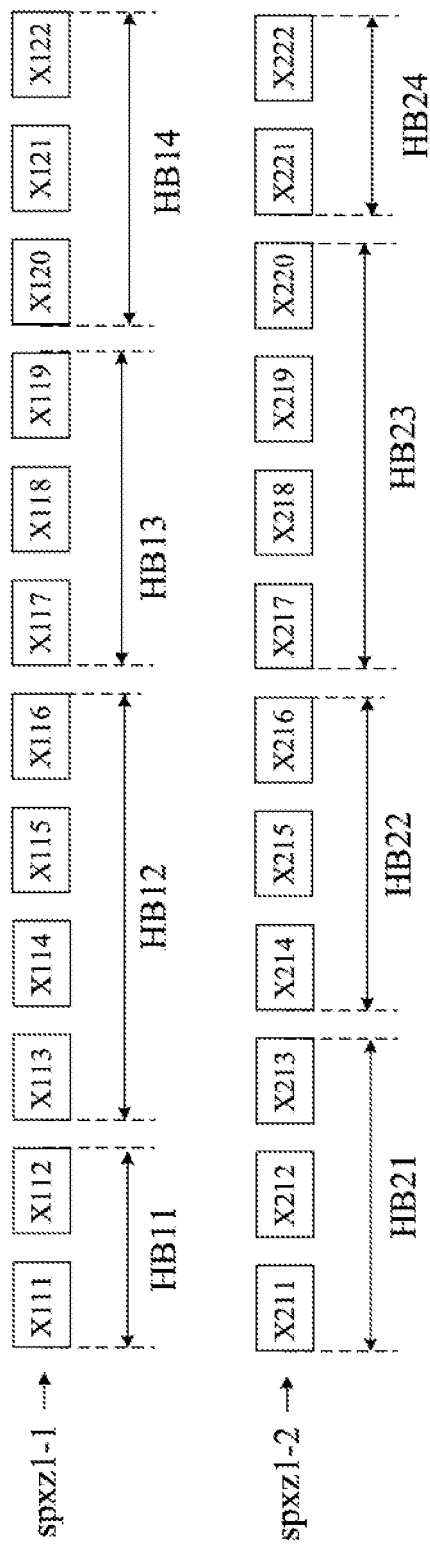
FIG. 9 is a schematic diagram of a panel sub-pixel and a merging area in an embodiment of the present disclosure.

Exemplarily, as shown in FIG. 9, a situation that a first panel sub-pixel group spxz1-1 has panel sub-pixels X111 to X122, and a second panel sub-pixel group spxz1-2 has panel sub-pixels X211 to X222 is taken as an example. The first panel sub-pixel group spxz1-1 is divided into 4 merging areas HB11 to HB14, the merging area HB11 has the panel sub-pixels X111 to X112, and the merging area HB12 has the panel sub-pixels X113 to X116. The merging area HB13 has the panel sub-pixels X117 to X119, and the merging area HB14 has the panel sub-pixels X120 to X122. In addition, the second panel sub-pixel group spxz1-2 is divided into 4 merging areas HB21 to HB24. The merging area HB21 has the panel sub-pixels X211 to X213, the merging area HB22 has the panel sub-pixels X214 to X216, the merging area HB23 has the panel sub-pixels X217 to X220, and the merging area HB24 has the panel sub-pixels X221 to X222.

A working process of the driving method provided by the embodiment of the present disclosure is described below in conjunction with the display panel shown in FIG. 9 and FIG. 5. A display frame may include a reset stage and a data refresh stage, and the data refresh stage may include a plurality of row scanning stages. A panel sub-pixel group corresponds to a row scanning stage. Only the first panel sub-pixel group is taken as an example for illustration below.

In the reset stage, a gate cutting-off signal is loaded on each scanning line, and a gate turning-on signal is loaded on each switch control line to control each switch control circuit to disconnect storage electrodes in two coupled panel sub-pixels. Specifically, the gate cutting-off signal (namely a low-level signal) is loaded on each scanning line GA, the gate turning-on signal (namely a high-level signal) is loaded on each switch control line SW, and the first switch transistors M01 in all the panel sub-pixel are all conducted. The gate cutting-off signal loaded by the scanning lines GA is provided by the conducted first switch transistor M01 to the gate of the coupled second switch transistor M02 and the gate of the conducting control transistor M2, which may control the second switch transistor M02 to be cut off and control the conducting control transistor M2 to be conducted. In this way, the storage electrodes 113 in the adjacent panel sub-pixels in the same panel sub-pixel group may be disconnected.

In the row scanning stage corresponding to the first panel sub-pixel group spxz1-1, the gate turning-on signal (namely the high-level signal) is loaded on the scanning line GA corresponding to the first panel sub-pixel group spxz1-1, and the gate cutting-off signals (namely the low-level signals) are loaded on the scanning lines GA corresponding to the other panel sub-pixel groups, so as to control the data writing transistor M1 in the first panel sub-pixel group spxz1-1 to be conducted, and control the data writing transistors M1 in the other panel sub-pixel groups to be cut off.

In addition, a gate cutting-off signal (namely the low-level signal) is loaded on the switch control line SW corresponding to the switch control circuit 200 between the second panel sub-pixel and the third panel sub-pixel, so as to control the first switch transistor M01 in the switch control circuit 200 between the second panel sub-pixel and the third panel sub-pixel to be cut off, such that the second switch transistor M02 in the switch control circuit 200 between the second panel sub-pixel and the third panel sub-pixel is cut off under the control of the low-level signal stored in the switch capacitor CE. In this way, the storage electrodes 113 in the second panel sub-pixel and the third panel sub-pixel in the first panel sub-pixel group spxz1-1 may be disconnected from one another.

Similarly, a gate cutting-off signal (namely the low-level signal) is loaded on the switch control line SW corresponding to the switch control circuit 200 between the sixth panel sub-pixel and the seventh panel sub-pixel, so as to control the first switch transistor M01 in the switch control circuit 200 between the sixth panel sub-pixel and the seventh panel sub-pixel to be cut off, such that the storage electrodes 113 in the sixth panel sub-pixel and the seventh panel sub-pixel in the first panel sub-pixel group spxz1-1 are disconnected from one another.

A gate cutting-off signal (namely the low-level signal) is loaded on the switch control line SW corresponding to the switch control circuit 200 between the ninth panel sub-pixel and the tenth panel sub-pixel, so as to control the first switch transistor M01 in the switch control circuit 200 between the ninth panel sub-pixel and the tenth panel sub-pixel to be cut off, such that the storage electrodes 113 in the ninth panel sub-pixel and the tenth panel sub-pixel in the first panel sub-pixel group spxz1-1 are disconnected from one another.

In addition, a gate turning-on signal (namely a high-level signal) is loaded on the switch control line SW corresponding to the switch control circuit 200 between the first panel sub-pixel and the second panel sub-pixel, such that the storage electrodes 113 in the first panel sub-pixel and the second panel sub-pixel in the first panel sub-pixel group spxz1-1 are conducted. In addition, a corresponding data signal is loaded on a data line corresponding to a panel sub-pixel in the merging area HB11, such that the same data signal may be input into each panel sub-pixel in the merging area HB11.

Similarly, a gate turning-on signal (namely a high-level signal) is loaded on the switch control line SW corresponding to the switch control circuit 200 between the third panel sub-pixel and the sixth panel sub-pixel, such that the storage electrodes 113 in the third panel sub-pixel and the sixth panel sub-pixel in the first panel sub-pixel group spxz1-1 are conducted. In addition, a corresponding data signal is loaded on a data line corresponding to a panel sub-pixel in the merging area HB12, such that the same data signal may be input into each panel sub-pixel in the merging area HB12.

A gate turning-on signal (namely a high-level signal) is loaded on the switch control line SW corresponding to the switch control circuit 200 between the seventh panel sub-pixel and the ninth panel sub-pixel, such that the storage electrodes 113 in the seventh panel sub-pixel and the ninth panel sub-pixel in the first panel sub-pixel group spxz1-1 are conducted. In addition, a corresponding data signal is loaded on a data line corresponding to a panel sub-pixel in the merging area HB13, such that the same data signal may be input into each panel sub-pixel in the merging area HB13.

A gate turning-on signal (namely a high-level signal) is loaded on the switch control line SW corresponding to the switch control circuit 200 between the tenth panel sub-pixel and the twelfth panel sub-pixel, such that the storage electrodes 113 in the tenth panel sub-pixel and the twelfth panel sub-pixel in the first panel sub-pixel group spxz1-1 are conducted. In addition, a corresponding data signal is loaded on a data line corresponding to a panel sub-pixel in the merging area HB14, such that the same data signal may be input into each panel sub-pixel in the merging area HB14.

In practical applications, by arranging the merging areas, a better display effect may be realized when fitting of a light emitting area in the panel sub-pixels and a color film or a 3D lens is offset. For example, when fitting is misplaced, the misplaced panel sub-pixels may be merged to improve the display effect. In addition, in a 3D scenario, combined with human eye tracking, there is also a need for display panel displacement and merging, for example, positions where buman eyes are located correspond to a plurality of panel sub-pixels in the 3D scenario, and then these panel sub-pixels corresponding to the human eyes may be merged.

Figure 10:
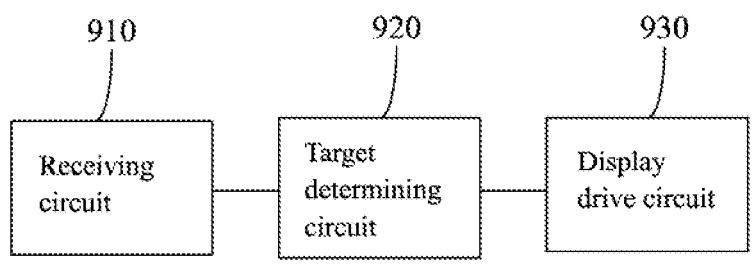
FIG. 10 is a schematic structural diagram of a display apparatus in an embodiment of the present disclosure.

An embodiment of the present disclosure further provides a drive circuit of a display panel, and as shown in FIG. 10, the drive circuit may include:
- a receiving circuit 910, configured to receive initial image data of a to-be-displayed frame, wherein a resolution of an initial image corresponding to the initial image data is different from a resolution of the display panel, and the initial image data includes a plurality of pieces of initial gray scale data for displaying the initial image;
- a target determining circuit 920, configured to determine target gray scale data corresponding to panel sub-pixels in the display panel according to the initial gray scale data in the initial image data, the resolution of the initial image and the resolution of the display panel; and
- a display drive circuit 930, configured to drive the display panel to display according to the target gray scale data.

It should be noted that a working principle and a specific implementation of the drive circuit are the same as those of the driving method in the above embodiments. Therefore, the working process of the drive circuit may be implemented by referring to the specific implementation in the above embodiments, which will not be repeated here.

In some examples, the receiving circuit, the target determining circuit and the display drive circuit in the drive circuit may take the form of a full hardware embodiment, a full software embodiment, or an embodiment combining software and hardware.

In some examples, the drive circuit may be a drive integrated circuit (IC).

An embodiment of the present disclosure further provides a display apparatus, including the above display panel provided by the embodiment of the present disclosure. The principle for solving problems of the display apparatus is similar to that of the aforementioned display panel, and thus the implementation of the display apparatus may refer to the implementation of the aforementioned display panel, and repetitions are omitted here.

An embodiment of the present disclosure further provides a display apparatus, including the drive circuit of the above display panel provided by the embodiment of the present disclosure. The principle for solving problems of the display apparatus is similar to that of the above drive circuit, and thus the implementation of the display apparatus may refer to implementation of the above drive circuit, and repetitions are here omitted here.

An embodiment of the present disclosure further provides a display apparatus, including the above display panel and drive circuit provided by the embodiments of the present disclosure. The principle for solving problems of the display apparatus is similar to that of the aforementioned display panel and drive circuit, and thus the implementation of the display apparatus may refer to the implementation of the aforementioned display panel and drive circuit, and repetitions are omitted here.

During specific implementation, in the embodiment of the present disclosure, the display apparatus may be: a mobile phone, a tablet, a television, a display, a laptop, a digital photo frame, a navigator and any product or component with a display function. Other essential components of the display apparatus shall be understood by those ordinarily skilled in the art, and are omitted here and also shall not be used as a restriction to the present disclosure.

Apparently, those skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variants.

What is claimed is:

1. A driving method of a display panel, comprising:
   receiving initial image data of a frame, wherein a resolution of an initial image corresponding to the initial image data is different from a resolution of the display panel, and the initial image data comprises a plurality of pieces of initial gray scale data for displaying the initial image;
   determining target gray scale data corresponding to panel sub-pixels in the display panel according to the initial gray scale data in the initial image data, the resolution of the initial image and the resolution of the display panel; and
   driving the display panel to display according to the target gray scale data;

wherein the resolution of the initial image is smaller than the resolution of the display panel;

wherein the panel sub-pixels in the display panel are arranged into panel sub-pixel groups in a first direction, and the plurality of panel sub-pixel groups are sequentially arranged in a second direction; the panel sub-pixels in a same panel sub-pixel group are the same in color;

image sub-pixels in the initial image are arranged into image sub-pixel groups in the first direction, and the plurality of image sub-pixel groups are sequentially arranged in the second direction; the image sub-pixels in a same image sub-pixel group are the same in color; an image sub-pixel corresponds to a piece of initial gray scale data; and the determining the target gray scale data corresponding to the panel sub-pixels in the display panel according to the initial gray scale data in the initial image data, the resolution of the initial image and the resolution of the display panel, comprises:

determining, according to the resolution of the initial image and the resolution of the display panel, that a total quantity of the image sub-pixel groups in the initial image is the same as a total quantity of the panel sub-pixel groups in the display panel, wherein a total quantity of the panel sub-pixels in a panel sub-pixel group is M times a total quantity of the image sub-pixels in an image sub-pixel group, M≥2, and M is an integer;

dividing M adjacent panel sub-pixels in each panel sub-pixel group into an adjustment area, such that an adjustment area corresponds to an image sub-pixel; and determining the target gray scale data corresponding to each panel sub-pixel in each adjustment area according to the initial gray scale data of the image sub-pixel corresponding to each adjustment area.

2. The driving method according to claim 1, wherein the determining the target gray scale data corresponding to each panel sub-pixel in each adjustment area according to the initial gray scale data of the image sub-pixel corresponding to each adjustment area, comprises:

determining each piece of initial gray scale data as the target gray scale data corresponding to a panel sub-pixel in the corresponding adjustment area; and determining, as for other panel sub-pixels except for the panel sub-pixel corresponding to the initial gray scale data in each adjustment area, the target gray scale data corresponding to the other panel sub-pixels in each adjustment area according to the initial gray scale data corresponding to each adjustment area, wherein the target gray scale data corresponding to each panel sub-pixel in the other panel sub-pixels is different.

3. The driving method according to claim 2, wherein the panel sub-pixels corresponding to the initial gray scale data are spaced with each other with an equal quantity of panel sub-pixels; and the panel sub-pixels corresponding to the initial gray scale data are close to an edge of the adjustment area where the panel sub-pixels are.

4. The driving method according to claim 3, wherein the determining the target gray scale data corresponding to the other panel sub-pixels in each adjustment area according to the initial gray scale data corresponding to each adjustment area, comprises:

defining every two adjacent adjustment areas in the first direction as a first adjustment area and a second adjustment area;

determining a data difference value corresponding to the first adjustment area according to the quantity of the other panel sub-pixels in the first adjustment area, initial gray scale data corresponding to the first adjustment area and initial gray scale data corresponding to the second adjustment area; and determining the target gray scale data corresponding to the other panel sub-pixels in the first adjustment area according to the initial gray scale data corresponding to the first adjustment area and the data difference value.

5. The driving method according to claim 4, wherein the data difference value corresponding to the first adjustment area is determined by a following formula:

$$\Delta da = \frac{da_{01} - da_{02}}{M+1};$$

wherein, $\Delta da$ represents the data difference value, $da_{01}$ represents the initial gray scale data corresponding to the first adjustment area, $da_{02}$ represents the initial gray scale data corresponding to the second adjustment area, and M represents the quantity of the other panel sub-pixels in the first adjustment area; and the target gray scale data corresponding to the other panel sub-pixels in the first adjustment area is determined by a following formula:

$$da_m = da_{01} - m*\Delta da;$$

wherein, m represents an $m^{th}$ panel sub-pixel of the other panel sub-pixels in the first adjustment area, and $da_m$ represents target gray scale data corresponding to the $m^{th}$ panel sub-pixel.

6. The driving method according to claim 2, wherein each panel sub-pixel comprises a storage electrode; the display panel further comprises: a plurality of switch control circuits, a plurality of scanning lines, a plurality of data lines and a plurality of switch control lines; a panel sub-pixel group corresponds to at least one scanning line among the plurality of scanning lines, and the panel sub-pixels arranged in the second direction correspond to at least one data line among the plurality of data lines;

in each panel sub-pixel group, every two adjacent panel sub-pixels are coupled through a switch control circuit; the switch control circuit is further coupled with the corresponding scanning line and at least one switch control line among the plurality of switch control lines;

in response to the target gray scale data corresponding to each panel sub-pixel in the other panel sub-pixels being different, the driving the display panel to display according to the target gray scale data, comprises:

loading a gate cutting-off signal on each scanning line and loading a gate turning-on signal on each switch control line, to control each switch control circuit to disconnect the storage electrodes in two coupled panel sub-pixels;

loading gate turning-on signals on the scanning lines one by one, loading a gate cutting-off signal on each switch control line, and loading the target gray scale data on each data line, such that the corresponding target gray scale data is input into the storage electrode of each panel sub-pixel; and in response to the target gray scale data corresponding to each panel sub-pixel in the adjustment area being the same, the driving the display panel to display according to the target gray scale data, comprises:

loading a gate cutting-off signal on each scanning line and loading a gate turning-on signal on each switch control line, to control each switch control circuit to disconnect the storage electrodes in two coupled panel sub-pixels; loading gate turning-on signals on the scanning lines one by one, and loading the target gray scale data on the data line corresponding to a panel sub-pixel in each adjustment area, such that the corresponding target gray scale data is input into the storage electrode of each panel sub-pixel, wherein in response to the gate turning-on signal being loaded on the scanning line corresponding to a panel sub-pixel group, loading the gate cutting-off signal on the switch control line corresponding to the switch control circuit between every two adjacent panel sub-pixels which are in the panel sub-pixel group and located in different adjustment areas, and controlling the switch control circuit to disconnect the storage electrodes in the two coupled panel sub-pixels; and loading the gate turning-on signal on the switch control line corresponding to the switch control circuit between every two adjacent panel sub-pixels which are in the panel sub-pixel group and located in the same adjustment area, and controlling the switch control circuit to conduct the storage electrodes in the two coupled panel sub-pixels.

7. The driving method according to claim 3, wherein the determining the target gray scale data corresponding to the other panel sub-pixels in each adjustment area according to the initial gray scale data corresponding to each adjustment area, comprises:

determining, as for each adjustment area, the target gray scale data corresponding to the other panel sub-pixels in the adjustment area according to a following formula:

$$da_n = da_{00} * \beta_n + \gamma_n;$$

wherein, n represents an $n^{th}$ panel sub-pixel of the other panel sub-pixels in the adjustment area, $da_n$ represents target gray scale data corresponding to the $n^{th}$ panel sub-pixel, $da_{00}$ represents the initial gray scale data corresponding to the adjustment area, and $\beta_n$ and $\gamma_n$ represent parameters corresponding to the pre-determined $n^{th}$ panel sub-pixel respectively.

8. The driving method according to claim 1, wherein the determining the target gray scale data corresponding to each panel sub-pixel in each adjustment area according to the initial gray scale data of the image sub-pixel corresponding to each adjustment area, comprises:

determining each piece of initial gray scale data as the target gray scale data corresponding to each panel sub-pixel in corresponding adjustment area, such that the target gray scale data corresponding to each panel sub-pixel in the adjustment area is the same.

9. A drive circuit of a display panel, comprising:

a receiving circuit configured to receive initial image data of a frame, wherein a resolution of an initial image corresponding to the initial image data is different from a resolution of the display panel, and the initial image data comprises a plurality of pieces of initial gray scale data for displaying the initial image;

a target determining circuit configured to determine target gray scale data corresponding to panel sub-pixels in the display panel according to the initial gray scale data in the initial image data, the resolution of the initial image and the resolution of the display panel; and a display drive circuit configured to drive the display panel to display according to the target gray scale data;

wherein the resolution of the initial image is smaller than the resolution of the display panel;

wherein the panel sub-pixels in the display panel are arranged into panel sub-pixel groups in a first direction, and the plurality of panel sub-pixel groups are sequentially arranged in a second direction; the panel sub-pixels in a same panel sub-pixel group are the same in color;

image sub-pixels in the initial image are arranged into image sub-pixel groups in the first direction, and the plurality of image sub-pixel groups are sequentially arranged in the second direction; the image sub-pixels in a same image sub-pixel group are the same in color; an image sub-pixel corresponds to a piece of initial gray scale data; and the target determining circuit determines the target gray scale data by followings:

determining, according to the resolution of the initial image and the resolution of the display panel, that a total quantity of the image sub-pixel groups in the initial image is the same as a total quantity of the panel sub-pixel groups in the display panel, wherein a total quantity of the panel sub-pixels in a panel sub-pixel group is M times a total quantity of the image sub-pixels in an image sub-pixel group, M≥2, and M is an integer;

dividing M adjacent panel sub-pixels in each panel sub-pixel group into an adjustment area, such that an adjustment area corresponds to an image sub-pixel; and determining the target gray scale data corresponding to each panel sub-pixel in each adjustment area according to the initial gray scale data of the image sub-pixel corresponding to each adjustment area.

10. A display apparatus, comprising: the drive circuit of the display panel according to claim 9.

* * * * *